United States Patent
Schemmann et al.

(10) Patent No.: US 7,809,264 B2
(45) Date of Patent: Oct. 5, 2010

(54) PRESCRIPTIVE AND DIAGNOSTIC SYSTEM AND METHOD FOR COMBINED RF/OPTICAL TRANSMISSION MANAGEMENT

(75) Inventors: Marcel Franz Christian Schemmann, West Hartford, CT (US); Venkatesh Gururaj Mutalik, Middlesex, CT (US); Roy Allen Harbert, Allegheny, PA (US); William John Zenkus, New Haven, CT (US)

(73) Assignee: Arris Group, Inc., Suwanee, GA (US)

( * ) Notice: Subject to any disclaimer, the term of this patent is extended or adjusted under 35 U.S.C. 154(b) by 1272 days.

(21) Appl. No.: 11/350,105

(22) Filed: Feb. 9, 2006

(65) Prior Publication Data

US 2006/0218616 A1 Sep. 28, 2006

Related U.S. Application Data

(60) Provisional application No. 60/650,973, filed on Feb. 9, 2005.

(51) Int. Cl.
*H04B 10/08* (2006.01)
*H04B 17/00* (2006.01)

(52) U.S. Cl. .............................. 398/38; 398/9; 398/25; 725/129

(58) Field of Classification Search ................. 725/107, 725/111, 118, 121, 124, 125, 127, 129, 144; 370/318; 398/9, 25, 26, 37, 38
See application file for complete search history.

(56) References Cited

U.S. PATENT DOCUMENTS

| 6,577,875 | B1 * | 6/2003 | Brouwer ..................... 455/522 |
| 6,711,135 | B1 * | 3/2004 | Dziekan et al. ............. 370/242 |
| 2003/0002110 | A1 * | 1/2003 | Schemmann et al. ........ 359/154 |
| 2003/0182664 | A1 * | 9/2003 | Lusky et al. ................ 725/111 |

* cited by examiner

*Primary Examiner*—Ken N Vanderpuye
*Assistant Examiner*—Daniel G Dobson
(74) *Attorney, Agent, or Firm*—FSP LLC

(57) ABSTRACT

A diagnostic and prescriptive system and method for management of a combined optical and RF cable plant system. In an exemplary embodiment the method and system uses optical receivers in a hub or headend to determine a variety of cable plant parameters such as the OMI of the received signal and automatically facilitated prescriptive service through prioritization and automatic recalibration. In another exemplary embodiment the method allows doing such signal OMI measurements in a closed loop system (that is a fully operational system). In addition, a further exemplary method and system allows storing of standard receiver calibration information such that from thereon signal OMI measurements that can be performed without signal interruption.

6 Claims, 21 Drawing Sheets

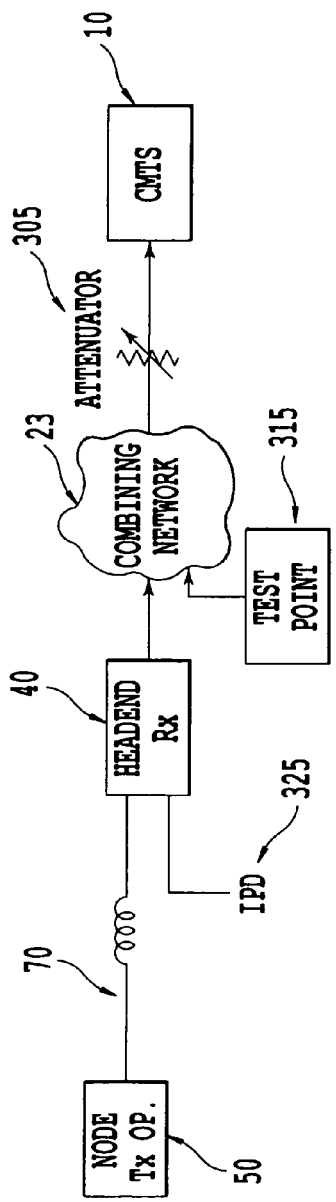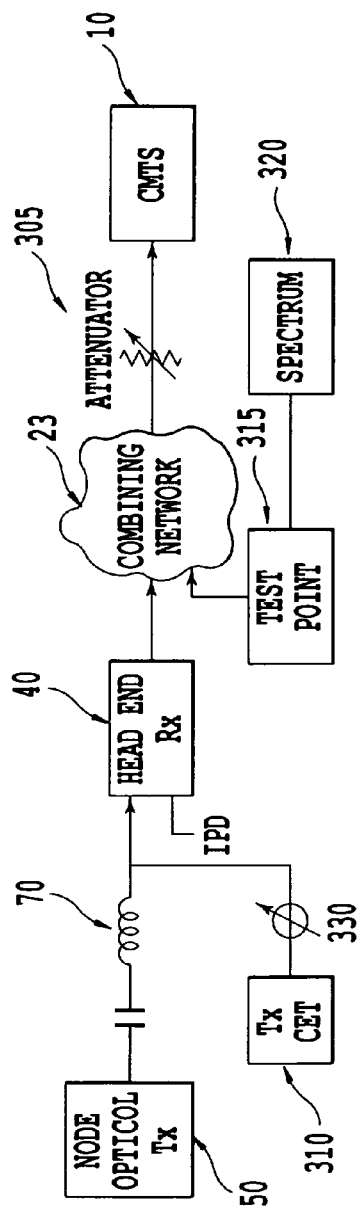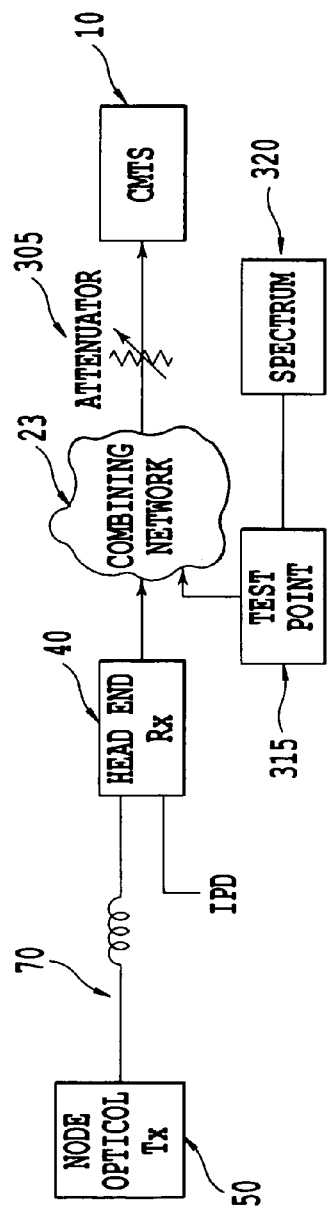

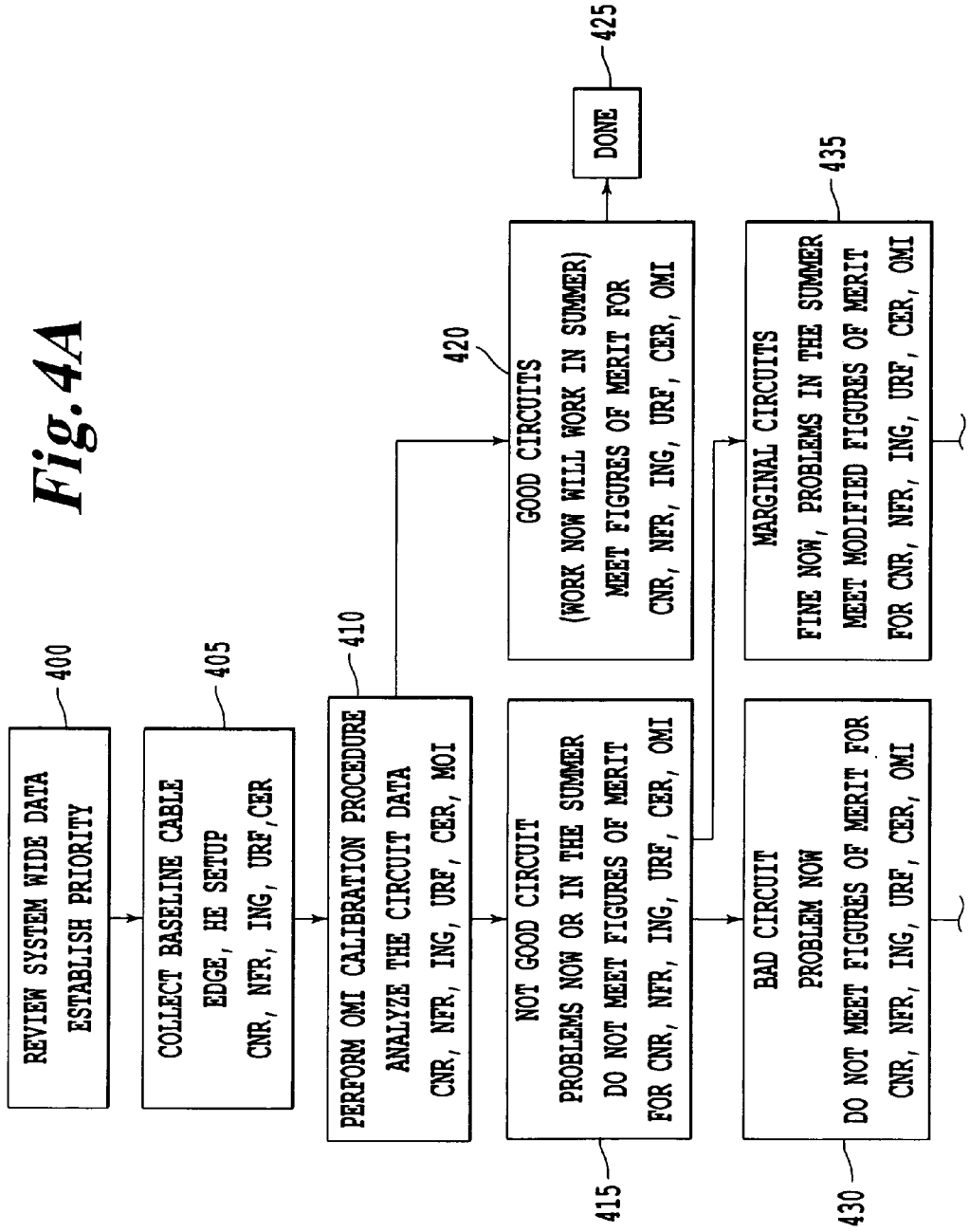

PRESCRIPTIVE AND DIAGNOSTIC SYSTEM AND METHOD FOR COMBINED RF/OPTICAL TRANSMISSION MANAGEMENT

CROSS-REFERENCES TO RELATED APPLICATION

This application is related to, and claims the benefit of the earlier filing date of, U.S. Provisional Patent Application Ser. No. 60/650,973, filed Feb. 9, 2005, entitled "Prescriptive and Diagnostic System and Method for Combined RF/Optical Transmission Management" the entirety of which is incorporated herein by reference.

BACKGROUND OF THE INVENTION

A combined RF/optical transmission system, for example an entire cable network, can be exceptionally complex. This complexity arises because the infrastructure was not initially built for interactive services. Originally, conventional combined RF/optical transmission systems were designed for television broadcast, which involves transmitting data in one direction (e.g., from a head-end transceiver to a cable television receiver in a user's home). Recently, the plant which was originally made for broadcast applications is becoming more and more interactive (e.g., transmitting data on a reverse channel from a transceiver in a user's home back to the head-end transceiver). Such reverse channel service allows for high speed internet access on cable, Voice over IP, and other interactive data services on cable over the cable network. However, because of the introduction of interactive services utilizing a reverse channel, the system has become exceptionally complex and difficult to maintain, in particular the interactive portion of the cable plant (e.g., the reverse channel portions of the network).

Further, because of the introduction of more and more services over the networks, the plant is continually evolving, making the plant difficult to use, service and maintain. Unlike a phone company, where a standard architecture has existed for 50 years or more and service and maintenance techniques are well-known, significant difficulty exists in configuring, servicing, and maintaining these combined RF/optical systems. For example, a cable system may have in excess of 2000 nodes, each requiring configuration and alignment. In order to diagnose a problem in each node, a field visit is typically needed requiring a physical visit by a technician to diagnose and fix any problems in the network. Such a process can be very expensive since physically accessing a node can be both time consuming and prohibitive depending on the physical location of the node. Compounding the problem is the difficulty identifying which nodes required field maintenance without actually going into the field.

Further, a common error requiring correction in a node is an adjustment of the output power of the laser associated with that node. In conventional systems, a transmitter in the node would be completely replaced with new hardware, either in the RF section or in the laser transmission section of the node, thus requiring an interruption in service to replace the hardware components.

FIELD OF THE INVENTION

The present invention is generally related to a hybrid RF/optical network diagnostic and prescriptive method and system, and more particularly, is related to a system, method and computer program product for analyzing various network parameters related to the system and diagnosing and prescribing solutions related to performance problems associated with a circuit within the system. The present invention also generally relates to an automatic power control feature, which is capable of automatically adjusting the output power of a signal transmitted from a node.

DESCRIPTION OF THE RELATED ART

Software packages are available which collect data at the various parts of a RF/optical system to facilitate plant management. These products have proven to be very valuable to customers by reducing field maintenance cost, but to-date, such products have not been able to provide automated prescriptive services. Further, the systems are not capable of acquiring data that is most valuable to a prescriptive service, including for example, the accurate optical modulation index (OMI) information in an active system.

There are several methods commercially available to obtain a calibrated OMI of an optical signal. These methods include using a OMI meter or a spectrum analyzer with a calibrated optical input (calibrated by the analyzer vendor). Whereas the OMI meter can at least be used in the field, analyzers with optical input are commonly expensive and are used in a lab environment when the RF input to the optical device is known. However, lab methods and OMI meters are not adequate to provide cable plant management services because different signals are present in an active cable plant. Further, to use the OMI meter the tested circuit must be broken, in effect are measuring a different optical circuit. When the original circuit is reconnected, the parameters that were just measured will likely change, thus rendering the OMI measurement largely ineffective.

Further, a common prescriptive action when a node is performing poorly is to adjust the output power of the optical signal transmitted from the node. However, conventional nodes include RF and optical circuits which output a signal at a constant power. Thus, adjusting the output power at the node requires breaking the circuit to insert an alternative hardware component resulting in an interruption of service. Further, adjusting the output power at the node may prove to be very expensive because such an adjustment requires a change in hardware, as discussed above.

SUMMARY OF THE INVENTION

A method, system and computer program product for diagnosis and prescription management of hybrid fiber-coax network, including collecting network performance parameters relating to a circuit, comparing the collected network performance parameters with thresholds of the performance parameters to grade circuit performance, selecting a circuit, based on the comparing step, in which at least on of the network performance parameters falls below a respective threshold, determining additional performance parameters to be tested on the selected circuit, the additional performance parameter measurement comprising at least an RF power measurement, and modifying the selected circuit based on the determined additional performance parameters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A-3C show the circuit configurations through the steps of performing an OMI calibration;

DETAILED DESCRIPTION OF THE PREFERRED EMBODIMENTS

Figure 1:
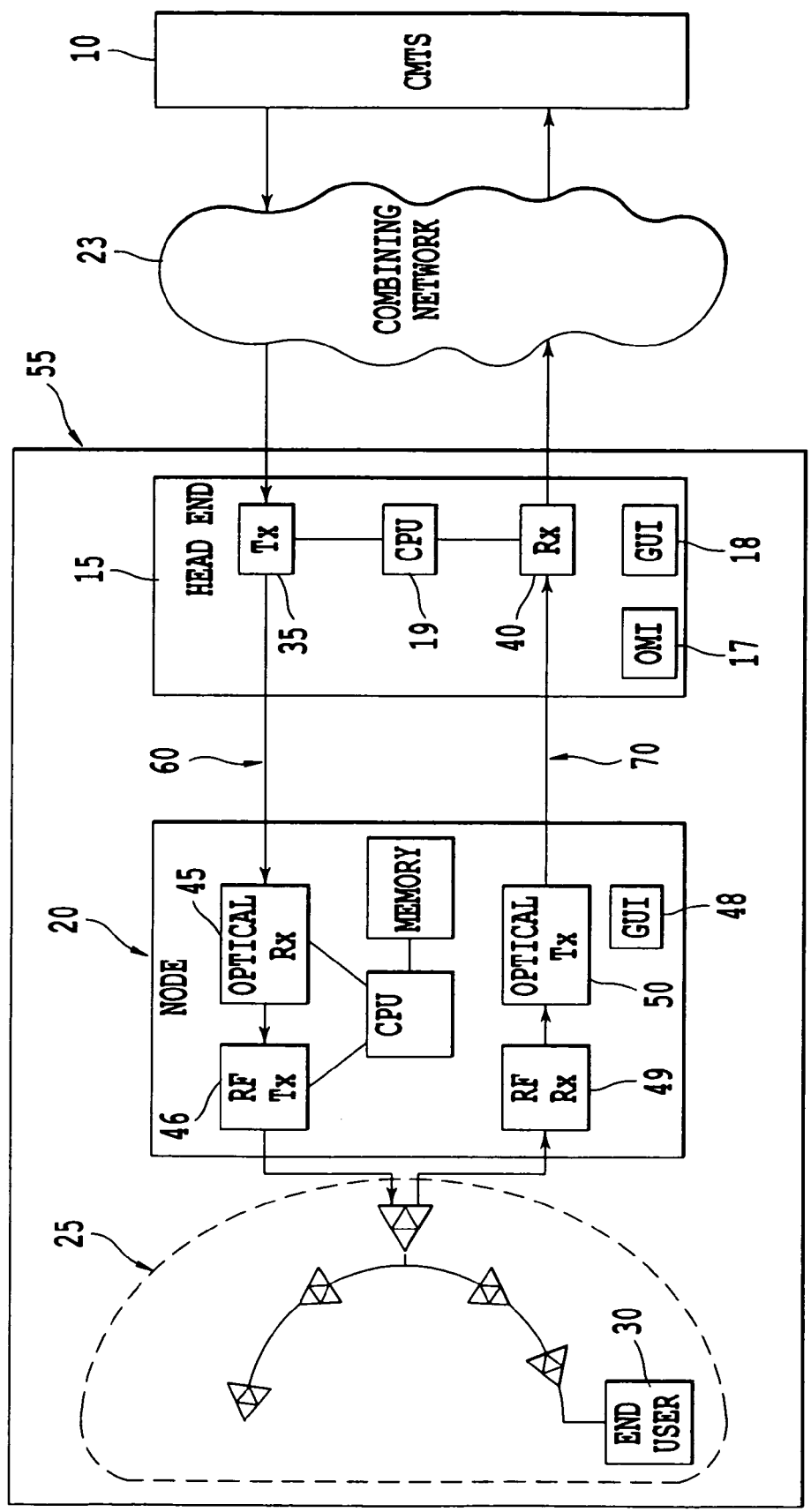
FIG. 1 shows a hybrid RF/optical circuit.
Figure 2:
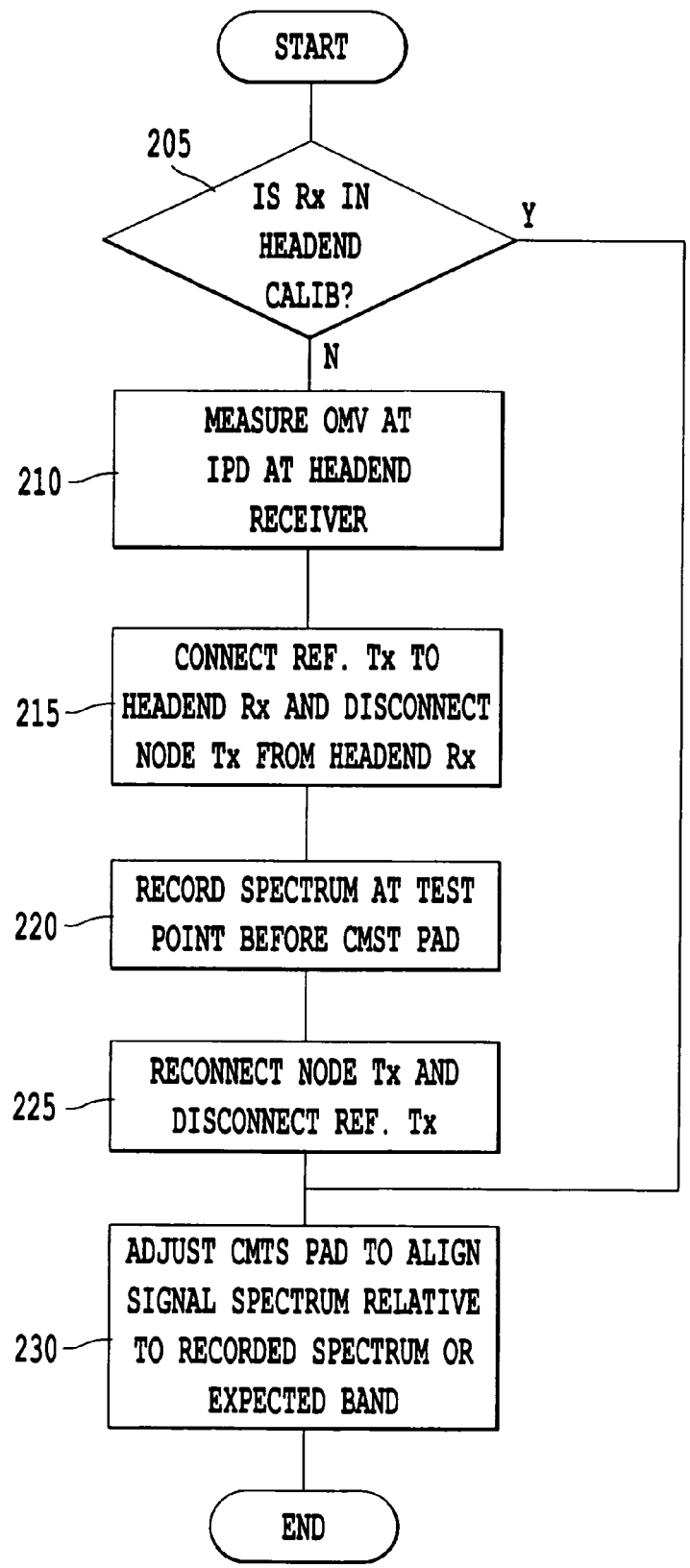
FIG. 2 is a flow chart of a process for calibrating OMI.

Referring now to the drawings, wherein like reference numerals designate identical or corresponding parts throughout the several views.

An exemplary embodiment the diagnostic and prescriptive system uses optical receivers in a hub or headend to determine a variety of cable plant parameters such as the OMI of the received signal. The system then automatically facilitates prescriptive service through prioritization and automatic recalibration. The system and method is configured such that the signal OMI measurements are performed in a closed loop system (that is a fully operational system), and standard receiver calibration information, such as signal OMI measurements, can be performed without signal interruption.

An exemplary portion of portion of a hybrid RF/optical network is depicted in FIG. 1, for example. A cable modem termination system 10 (CMTS) is located at the local office of a cable television company and exchanges digital signals with a cable modem, or other end-user equipment 30 configured to exchange signals over the network. A data service may be delivered to a subscriber through channels in a coaxial cable or optical fiber cable to a cable modem installed externally or internally to an end user's 30 computer or television set. Reverse channels 60 are used for upstream signals from the end user 30 to the CMTS 10, and forward channels are used for downstream signals 70 from the CMTS 10 to the end user 30. When a CMTS receives signals from an end user, it converts these signals into Internet Protocol (IP) packets, which are then sent to an IP router for transmission across the Internet. It should be noted that the CMTS may also convert these signals into other protocols suitable for transmission over a network to facilitate the exchange of data between the end user's 30 and a data network. It should be noted that the CMTS 10 is used for both forward channels (i.e. send data to an end user) and reverse channels (i.e., receive signals from an end user).

When the CMTS 10 transmits signals to an end user, it modulates the forward channel signals for transmission through a circuit 55 to the cable to the end user 30. In an exemplary embodiment, the circuit 55 includes a head end 15, a node 20 and the RF plant 25. The modulated data transmitted from the CMTS 10 in the forward channel 60 is received at a headend unit 15. The data transmitted from the CMTS 10 to the headend 15 may be transmitted optically, via RF signals, or via any other suitable transmission means. If the forward channel signals received in the headend unit 15 are RF signals, the signals are transformed in the transmitter 35 to optical signals and transmitted to an appropriate node 20 for distribution. The node 20 then receives the signals in an optical receiver 45 and converts the signals in an RF transmitter section 46 before transmitting the signals to the RF plan 25 for transmission to the an end user 30.

In the reverse channel (i.e., transmitting a signal to the CMTS 10 from the end user 30) the signal originates at the end user 30 and is transmitted via the RF plan 25 to the node 20. The node receiver 50 receives the signal in an RF receiver 49 and uses an optical transmitter 48 to convert the RF signal to an optical signal which is transmitted over the reverse channel 70 to the headend 15. The headend 15 then transmits the signal to the CMTS 10.

The node 20, also includes at least one or a plurality of microprocessors 47 to control various operational parameters of the node 20. Similarly, the headend 15 also includes at least one processor 19, which performs control of various operational parameters related to the headend. The node 20 and headend 15 each also include graphical user interfaces (48 and 18), which provide an interface to which a user may adjust various operational parameters related to the components. Further, the headend 15 includes an OMI test point, which determines an OMI of a signal received at the headend 15, from the node 20. The above noted components of the node and headend will be discussed in greater detail below.

In hybrid RF/optical networks, has generally shifted to monitoring systems to enhance network integrity and introduce advanced services such as VoIP, VOD and higher penetration of high-speed data. Of these services which utilize a reverse channel, VoIP stresses the system the most, even though it has very modest bandwidth requirements, due to its symmetric load and extreme sensitivity to latency and jitter. It is desirable for higher order modulation schemes to reclaim bandwidth in the reverse path, to reduce cost inventory and to promote ease of use in the forward path seamlessly.

This prescriptive and diagnostic system described below collects data relating to the network performance parameters at the headend and determines which circuits are performing poorly, and, is able to pinpoint specific problem components within the circuit. However, as part of the prescriptive and diagnostic system, it is preferable that the OMI at the node be calibrated properly to correspond to the OMI at the headend, which receives the signal.

OMI is a measure of the degree of modulation of the optical carrier by an RF signal. It is defined mathematically as the ratio of the amplitude RF modulating current to the average current:

$$OMI = \frac{I_{rf,amplitude}}{I_{avg}}.$$

The RF laser modulating current $I_{rf,peak}$, can be written as:

$$I_{rf,amplitude} = \frac{V_{rf,amplitude}}{75\Omega} = \frac{\sqrt{2} \cdot V_{rf,rms} \cdot k}{75\Omega}$$

where $V_{rf,rms}$ is the input to the laser matching circuit, and k is the laser match factor. The average laser bias current above the laser threshold current, $I_{bth}$, can be written as:

$$I_{bth} = \frac{P_{opt}}{\varepsilon}$$

where $P_{opt}$ is the average output optical power, and E is the laser slope efficiency. Therefore, the amplitude OMI, m, can be written as:

$$m = \frac{\sqrt{2} \cdot V_{rf,rms} \cdot k \cdot \varepsilon}{P_{opt} \cdot 75\Omega}$$

The effective OMI, μ, is a measure of the rms modulation of the optical signal and, for the case of sinusoidal modulation with N channels, is equal to:

$$\mu = \frac{m \cdot \sqrt{2 \cdot N}}{2}$$

The effective OMI is directly proportional to laser input voltage, and therefore if the input voltage changes by a certain ratio, the effective OMI will change by the same ratio:

$$\mu \alpha V_{rf,rms}, \text{ therefore } \frac{\mu_1}{\mu_2} = \frac{V_1}{V_2}$$

If V1 and V2 are expressed in terms of dBmV, then $$\frac{\mu_1}{\mu_2} = \frac{10^{\left(\frac{V_1}{20}\right)}}{10^{\left(\frac{V_2}{20}\right)}}, \text{ or } \frac{\mu_1}{\mu_2} = 10^{\left(\frac{V_1-V_2}{20}\right)}$$

Conversely, a change in effective OMI involves a change in drive voltage:

$$V_1 - V_2 = 20 \cdot \log\left(\frac{\mu_1}{\mu_2}\right)$$

As the modulation index of the laser is increased, distortion will cause the bit-error-rate (BER) of the digital signals to increase before distortion is visible in the analog signals. In fact, a 1 dB increase in the OMI can cause a 600-fold increase in BER, once the laser is operating in its non-linear region. Even as the digital performance starts to degrade, the analog quality actually improves, since driving the laser harder increases the carrier-to-noise ratio (CNR).

One embodiment of the system and method involves calibrating a standard receiver by creating a transmitter with calibrated OMI (instead of a receiver with OMI calibration such as an OMI meter or lab equipment). The OMI of this transmitter needs only to be calibrated once using a calibrated receiver (and may be periodically verified) in a controlled environment. Then the transmitter can be applied in the headend of the system.

The OMI of the signals received from the node transmitter 50 to the headend receiver 40 is determined while the system is in normal operation. Methods for determining the signal OMI may include choosing proper resolution bandwidth and video bandwidth on a spectrum analyzer and recording free run and max hold traces, where the video bandwidth is selected in relation to the expected signal burst duration. Note that any method that does not measure OMI in a closed loop running system does not provide an accurate measurement because in an open loop system signal levels are not adjusted automatically as in a real system and also burst signal OMI cannot be determined by simply measuring average OMI. Also note that such a closed loop method provides an accurate method of measuring link OMI, which is the main parameter that determines the performance of optical links. By comparison, other methods that are based on RF testing of transmitter test points and node test points allow for a significant residual uncertainty in the true optical OMI, even if the behavior of the closed loop operation were fully predictable.

A process of calibrating the OMI at the reverse transmitter will be described in reference to the flow chart of FIG. 2, and FIGS. 3A-3C. The process is initiated by determining whether the receiver in the headend 40 is already calibrated (step 205), if the receiver is not calibrated the process continues to step 210. In step 210, the photo diode current (IPD) 325 is used to measure the optical monitor voltage (OMV) corresponding to the average power of the optical signal received at the headend receiver 40, while receiving a signal from the node transmitter 50. The signal received at the headend receiver 40 is then sent to a combining network 23 to be combined with other signals from other headend receivers before being transmitted through an attenuator 305 to the CMTS 10.

After the OMV is measured at step 210, the node transmitter 50 is disconnected from the headend receiver 40, and a reference transmitter 310 is connected. The reference transmitter 310 is injected into the receiver through a variable optical attenuator 330. The attenuator 330 is adjusted to obtain an identical OMV (this ensures that the same optical power is hitting the receiver) at the headend receiver 40. Then, at step 220, the RF spectrum at the receiver output is measured at a test point 315 using an RF spectrum analyzer 320. The spectrum measurement is stored, for instance on a trace at the spectrum analyzer, so that it can be displayed at the background of the spectrum analyzer.

At step 225, the link from the node transmitter 50 is re-established and it is verified that the same OMV is obtained on the receiver. If the spectrum received at the test point 315 deviated from the ideal stored signal spectrum 320, the attenuator 305 in the link from the combining network 23 to the CMTS 10 may be adjusted so that the actual signal spectrum received from the node transmitter 50 matches the stored signal spectrum 320. For example, if an increase in OMV is required at the headend receiver 40, the attenuator 305 may proportionally lower the signal power at a level proportional to the intended increase, so that the node transmitter 50 is automatically gain controlled (via a signal from the CMTS) to compensate for the shortcoming in the received signal OMV. Alternatively, the node transmitter 50 may be controlled by a microcontroller (either remotely or locally) to adjust the gain level, as will be discussed below.

The method described above provides a procedure for accurately calibrating, and thereby measuring the performance of optical links. However, a brief interruption of service is still needed to perform the measurement when the hub transmitter 50 is taken off-line. After the calibration procedure described above the receiver calibration information can be stored and re-used to evaluate link performance at another time (as needed) by simply measuring the test point RF spectrum and comparing the measured spectrum against the stored spectrum obtained using the reference transmitter 310. Receivers may also be manufactured with calibrated OMI measurement internally or to the test point or even with internal spectrum analysis capability; this is discussed in a separate section.

During the OMI calibration step the communication channel is broken, as discussed above. Typically, a node corresponds to a particular CMTS channel and only that channel is affected. However, when multiple nodes feed one CMTS channel, the presence of the OMI calibration signal would also interrupt the service of the other nodes. In order to avoid this, the receiver under calibration may be disconnected from the CMTS combiner network and the calibration may be performed using the receiver test point 315.

This OMI calibration procedures noted above provide a baseline for the diagnostic and prescriptive method discussed below. Once the OMI calibration is performed, the method noted below may be used to diagnose system problems and provide prescriptive remedies to correct problems that are detected in poorly performing circuits.

Figure 4B:
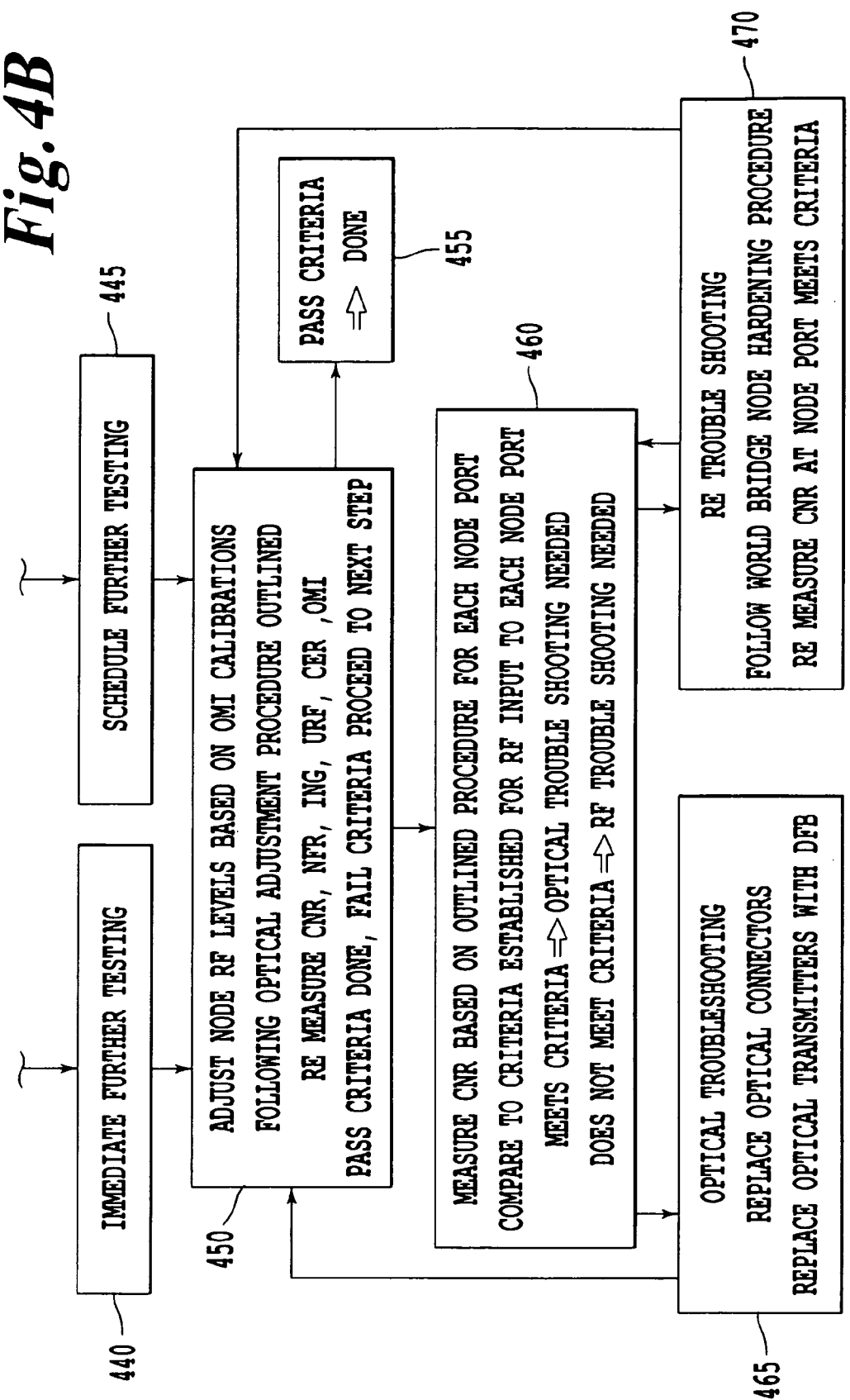
FIG. 4 is a flow chart showing process steps taken to diagnose a circuit.
Figure 11:
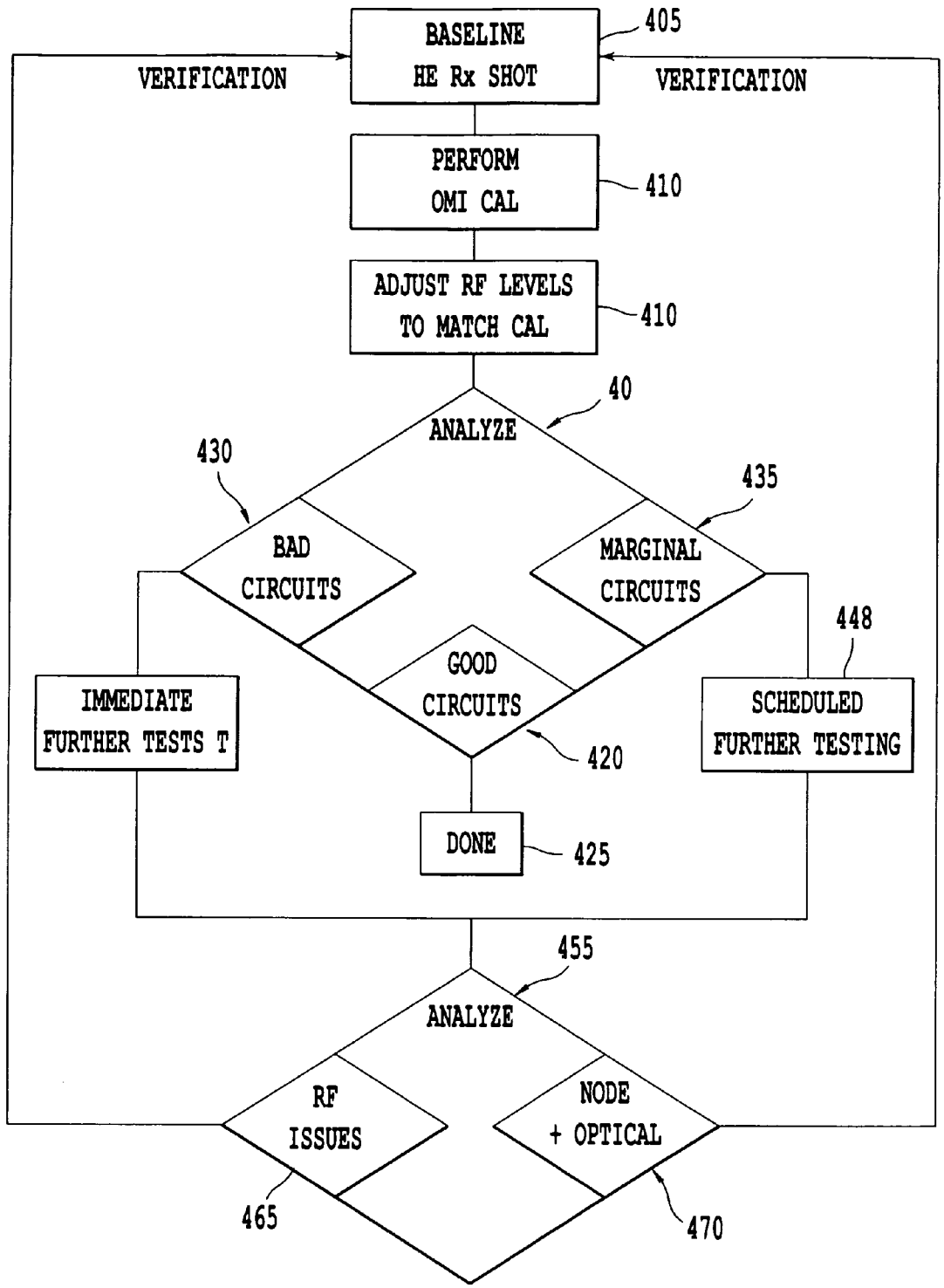
FIG. 11 is a flow chart showing prescriptive and diagnostic processes according to one embodiment of the present invention.

Generally, as described in FIGS. 4 and 11 at step 400, system wide data is reviewed to establish a priority of which specific circuits will be analyzed. Such a priority determination may be made by a review of data performed by software programs or human inputs, such as reports of outages, etc, and an exemplary list of the prioritizing parameters are described in Table 1, below. Then, at step 405, baseline data is collected for the circuits to be analyzed. This data may include carrier-to-noise ratio (CNR), noise floor rise (NFR), ingress ING, average upstream modem RF output (URF), codeword error rate (CER), and any other pertinent network performance parameters. In step 410, receiver calibration is performed using the reference OMI, and reference spectrum output traces are stored, as described in reference to FIGS. 2 and 3A-3C. Step 410 also includes the process of analyzing each of the above-noted network parameters against a predetermined threshold, and identifying those circuits that may be problematic (i.e., measured network parameters fall below the predetermined network performance parameter thresholds). In step 415 and 420, the circuits are classified into groups identifying the "good" circuits, which meet the predetermined network performance parameters, and "not good circuits" having a measured network parameter that falls below the predetermined threshold. If the circuit is considered "good", then the process proceeds to step 425 and the analysis of the circuit in question is complete.

TABLE 1

Circuit Parameters Related to Prioritization
Prioritizing nodes for balancing

| Param's | Comments | | |
|---|---|---|---|
| DMH | Observed degraded modem hours | | |
| SDMH | Observed severely degraded modem hours | | |
| PM | Modern power | | |
| SNR | Receiver SNR | | |

| Limits | Units that fall between OK and bad are marginally bad | OK | Bad |
|---|---|---|---|
| DMH_max | Maximum tolerated degraded modem hours | 1% | 10% |
| SDMH_max | Maximum tolerated severely degraded modem hours | 1% | 5% |
| PM_min | Minimum tolerated average modem power | 40 | 37 |
| PM_max | Maximum tolerated average modem power | 46 | 49 |
| SNR_min | Minimum required SNR for service | 37 | 27 |

Alternatively, if the circuit is classified as "not good", then the process proceeds to steps 430 and 435 which further classify the circuits as "bad circuits" and "marginal circuits". The circuits classified as "bad circuits" do not meet the predetermined thresholds for the measured network performance parameters. On the other hand, "marginal circuits" only meet modified predetermined thresholds of the measured system performance parameters and may pose a problem, for example, in the summer when excess heat is applied to the node. The "marginal circuits" and "bad circuits", due to the poor network performance parameters, are candidates to fail during operation of the reverse link, especially during a voice-over-IP implementation, since the margin for error in such an application is significantly slim.

Figure 13:
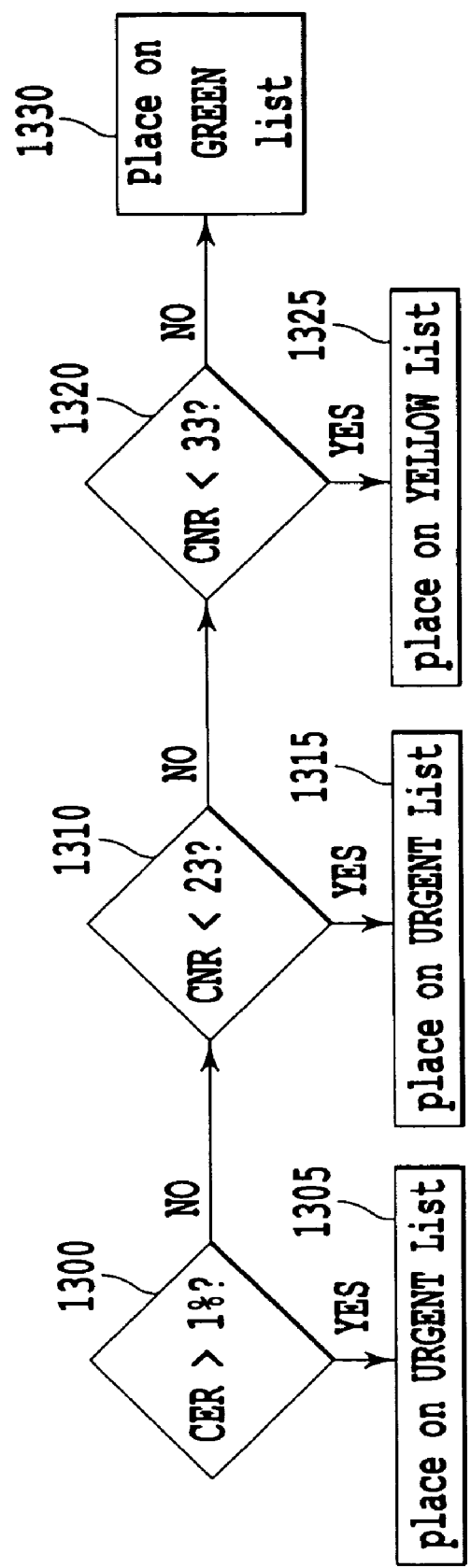
FIG. 13 is a flow chart of a process for performing signal analysis on a circuit to determine performance characteristics.

An example of the analysis performed by the system to categorize a circuit based on CER and CNR is depicted at FIG. 13. If the CER is greater that 1%, or the CNR is less than 23 (steps 123-1315), the circuit is immediately placed on the "urgent" or "bad" circuits list. If the CNR is between 23 and 33 (step 1320), the circuit is listed as "yellow" or "marginal", and if the CNR is greater than 33 (step 1320), the circuit is placed on the "good" or "green" circuits list.

At steps 440 and 445, an immediate additional testing and/or modification is scheduled for the "bad circuits", and a further testing and/or modification is scheduled for the "marginal circuits". It should be noted that the below noted procedures are described simply as further diagnostic testing and may be performed either remotely at the headend (or by another component in the network), or during a physical field visit to the portion of the circuit to be tested.

Figure 7:
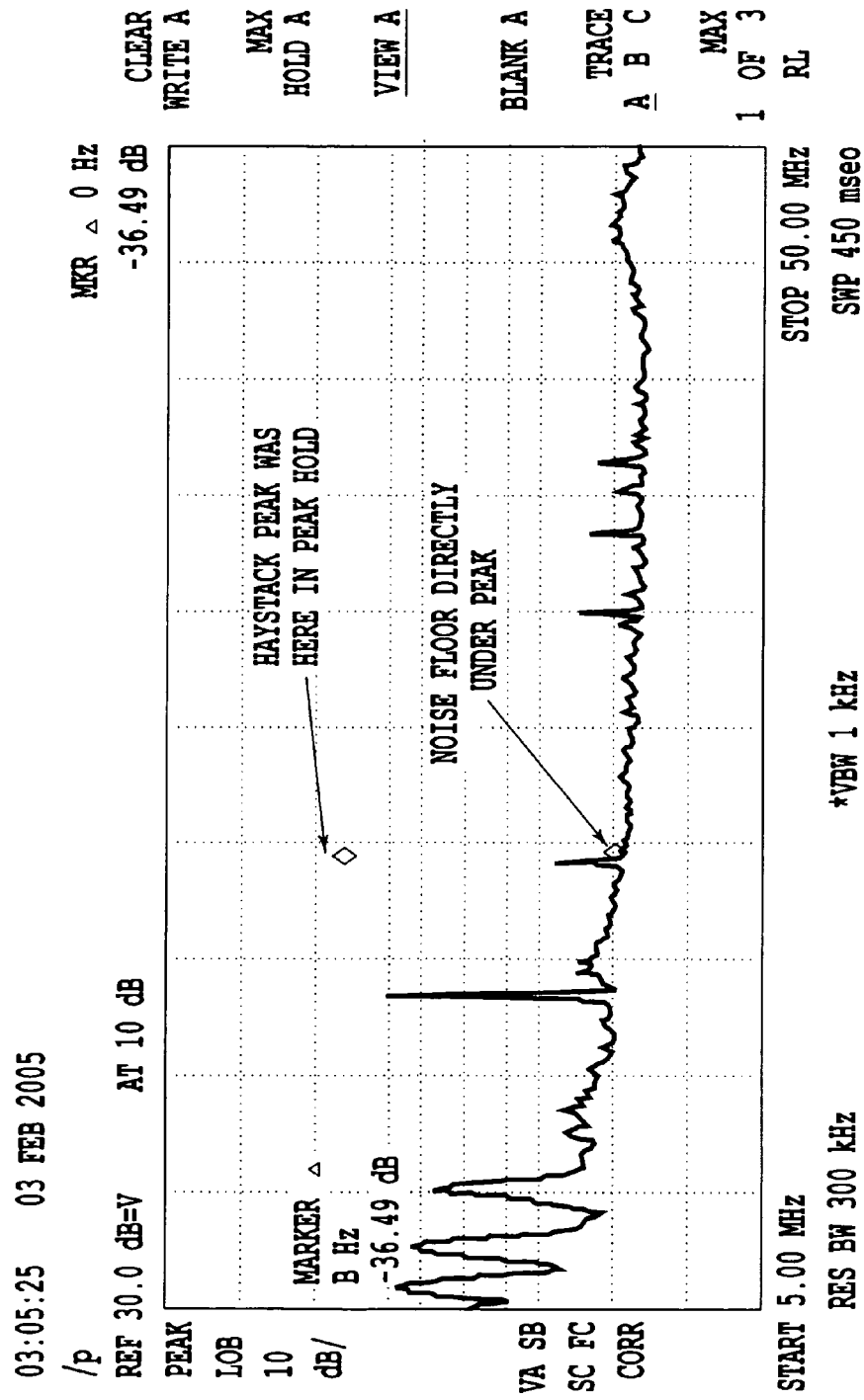
FIG. 7 is a spectrum trace showing an exemplary CNR measurement.

At step 450, the node 20 RF levels are adjusted based on the OMI calibration, then the network performance parameters are measured again to determine if the circuit meets the predetermined network performance parameter thresholds, as discussed above. If the circuit passes (i.e., exceeds the thresholds), the procedure is complete (step 455). However, if the circuit again fails to meet the predetermined thresholds, the process proceeds to step 460, in which the CNR is measured based on a predetermined procedure for each node port, and compared to predetermined criteria established for RF input into each node port. An exemplary spectral output of a received signal being examined for a CNR measurement is depicted at FIG. 7, for example. If the CNR meets the criteria, then further optical trouble shooting is recommended, alternatively, if the CNR does not meet the criteria, then RF plan trouble shooting is recommended. Step 465 outlines recommendations output by the system to perform optical trouble shooting (e.g., replace connectors, replace transmitters, etc.), and step 470 outlines recommendations for RF trouble shooting (e.g., RF hardening procedure, re-measure CNR at node point, etc.) Table 2 also lists parameters used to analyze node performance data in accordance with the above-noted procedure.

TABLE 2

Analyzing Node Date
Analyzing node data without actual testing, on per-node basis

| Param's | Comments |
|---|---|
| DMH | Observed degraded modem hours |
| SDMH | Observed severely degraded modem hours |
| T | Day temperature |
| PM | Modem power |
| SNR | Receiver SNR |

| Corelation | | Result | Analysis | Action |
|---|---|---|---|---|
| DMH | PM | positive | Unit is being clipped | Decrease CMTS attenuation if PM > PM_min |
| SNR | PM | negative | | |
| DMH | PM | negative | Not sufficient OMI | Increase CMTS attenuation is PM < PM_max |
| SNR | PM | positive | | |
| SNR | T | positive | Unit is getting clipped | Decrease CMTS attenuation if PM > PM_min |
| SNR | T | negative | Noise floor close | Increase CMTS attenuation is PM < PM_max |

It should also be noted that the circuits could be tested and analyzed completely using all the testing parameters at once, and the above noted testing steps may also be replaced by an ingress measurement that compares various long term and short term network performance parameters to diagnose the system. A specific embodiment using the ingress index measurement will be discussed below.

Reverse path systems in Cable systems generally funnel all information from all subscribers in the serving area into one reverse path optical transmitter. Because of the funneling, significant noise accumulates and manifests itself as impulse noise and a raised thermal noise floor in reverse systems. While the former is of limited duration, the later is pervasive and is a system characteristic.

Generally the reverse system comprises several cable modems inputting to the RF plant which then funnels the signals to the reverse transmitter which then feeds a headend receiver in turn feeding the CMTS. The CMTS generally output some statistics relating to errored packets and total packets, and commercial software packages generally take this information and report it within their systems.

The ratio of errored packages to the total packages generates a proxy for bit error rate, and there are theoretical models that explain the relationship between bit error rate (BER) and projected carrier to noise ratio (CNR). CNR is also separately obtained via direct tests. Generally the CNR is reported as a long-term value and the BER is a short-term value. As mentioned earlier the ingress is of limited duration. Therefore, the short term changes in BER while compared to a more steady long term CNR number in software would provide a representation of ingress. This reporting of ingress would then explain if systems were limited by pervasive noise or by ingress events. A system dominated by pervasive thermal noise would require a better optical laser at the node while a system dominated by ingress events would require additional plant maintenance. The processor within the headend of the system is capable of automatically determining the ingress index remotely, thereby quickly diagnosing problems within a circuit.

Figure 5A:
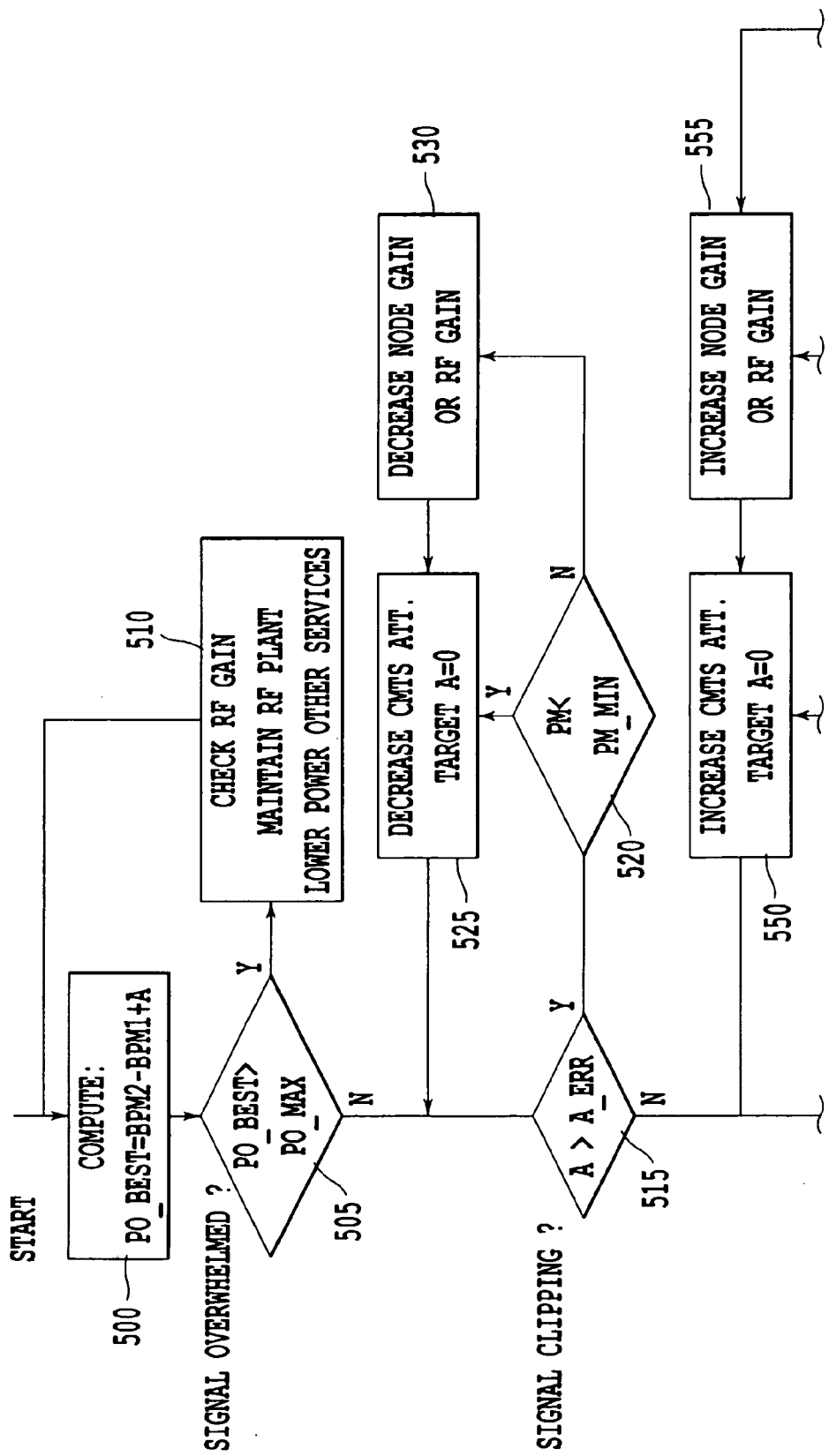
FIG. 5 is a flow chart showing process steps taken to prescribe a remedy to a poorly performing circuit.
Figure 5B:
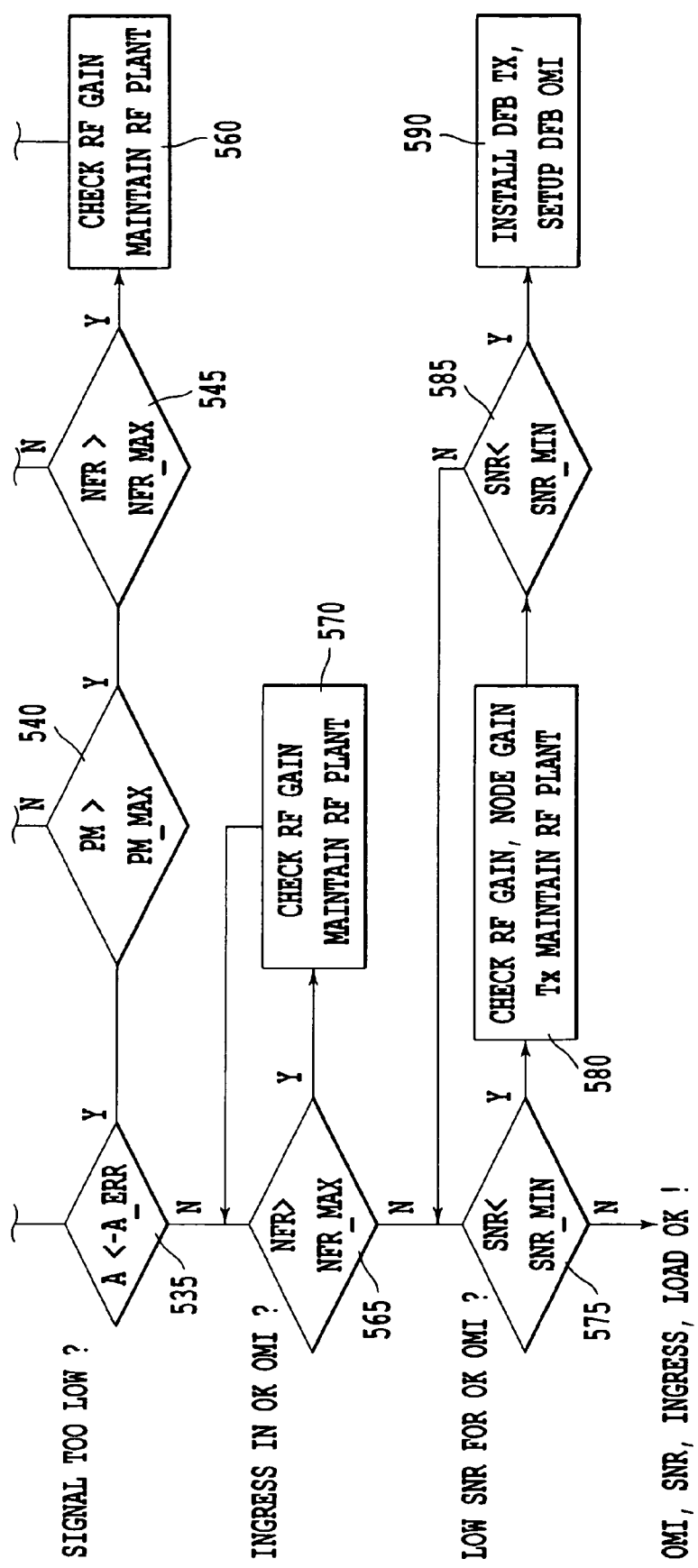
Figure 6:
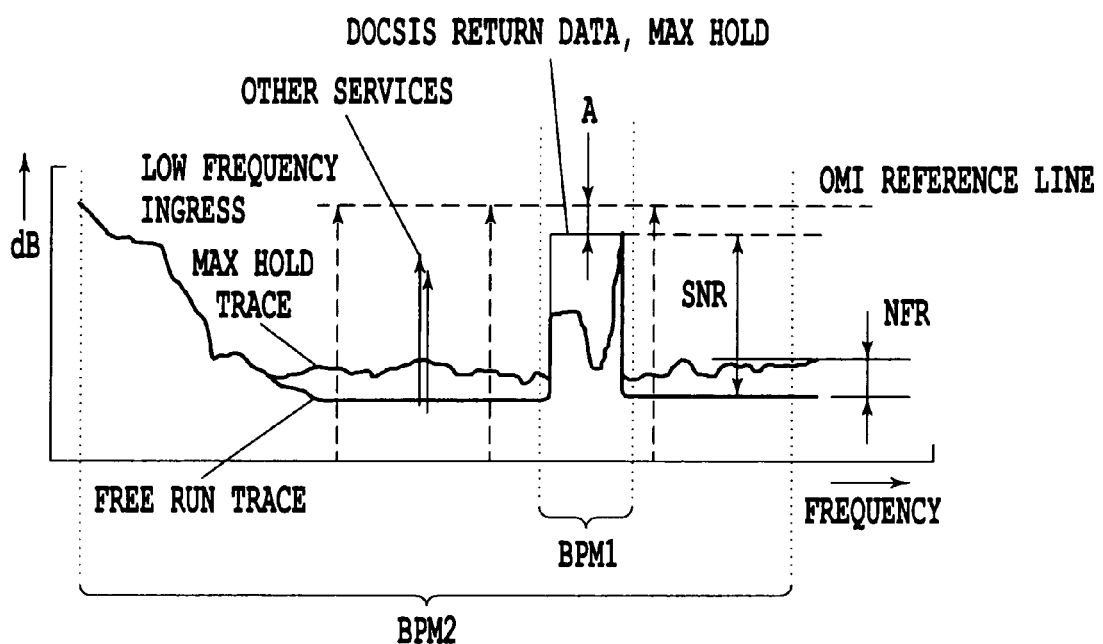
FIG. 6 is a spectrum trace of an exemplary signal received at a headend from a node.

The flowchart of FIG. 5 and the spectral display shown in FIG. 6 further define the prescriptive steps the system, and Table 3 indicates the parameters and associated limits used in the flowchart of FIG. 5.

The process begins at step 500, at which the best power output is calculated as the band power of the total return band minus the band power of the service plus the difference between the actual service OMI and the target OMI, as depicted in FIG. 6. At step 505, the process determines of the signal is overwhelmed by determining of the best power output is greater than the maximum tolerated power in the output band relative to the service. If it is (step 510), the system provides guidance to check the RF gain of the transmitter, maintain the RF plant and/or lower the power of other services. At step 515, the system can determine of the signal is clipping by comparing the difference in actual and target OMI to the error allowed in the OMI for a given service. If the difference is greater than the allowed error, it is determined (step 520) whether the average modem power is less than the minimum tolerated average modem power. If it is, the system outputs a recommendation to decrease the attenuator of the CMTS, however if it is not (step 530) the system provides a recommendation to decrease the node gain or the RF gain, before decreasing the CMTS attenuator.

Figure 8:
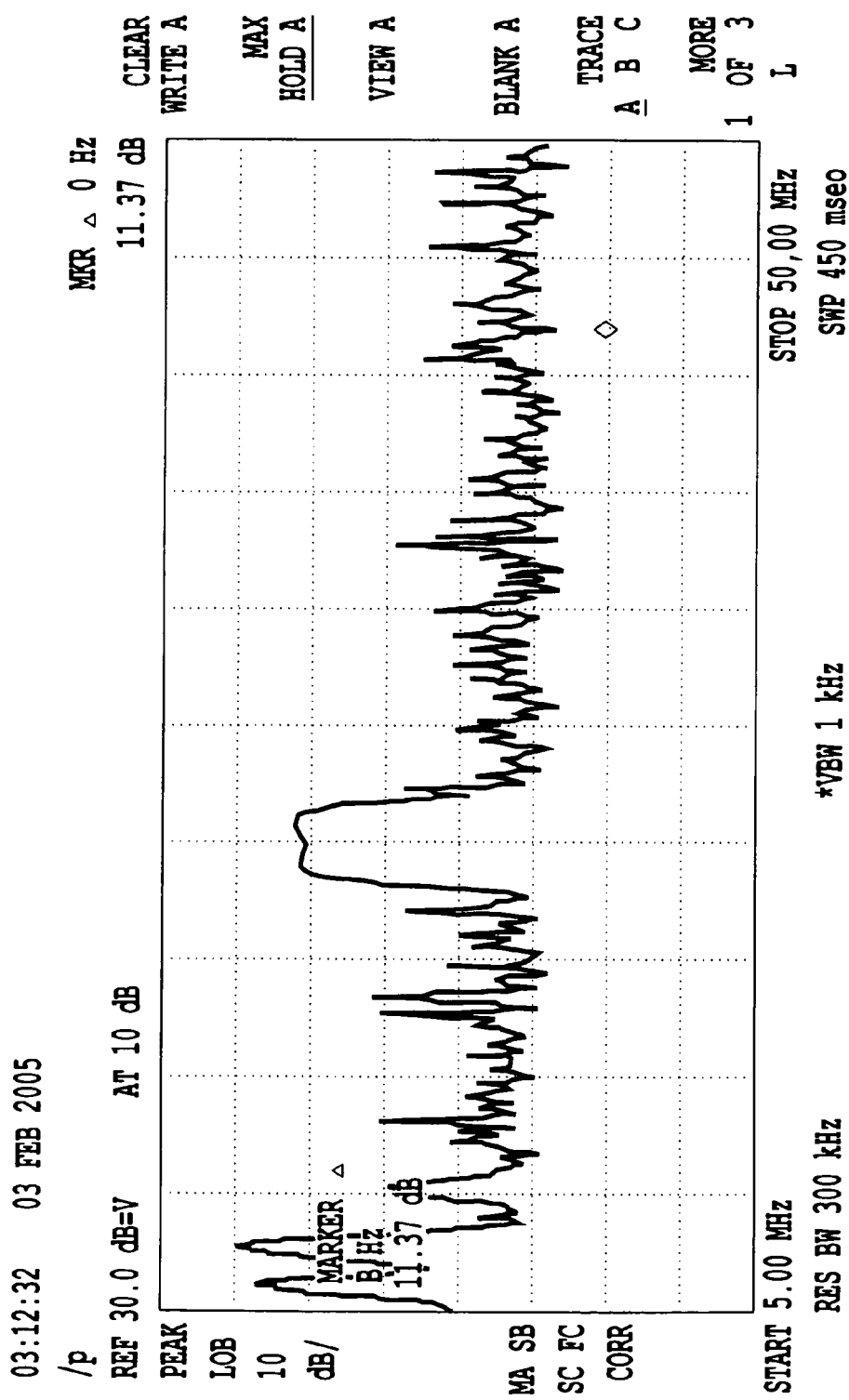
FIG. 8 is a spectrum trace showing a signal with poor noise floor elevation.
Figure 9:
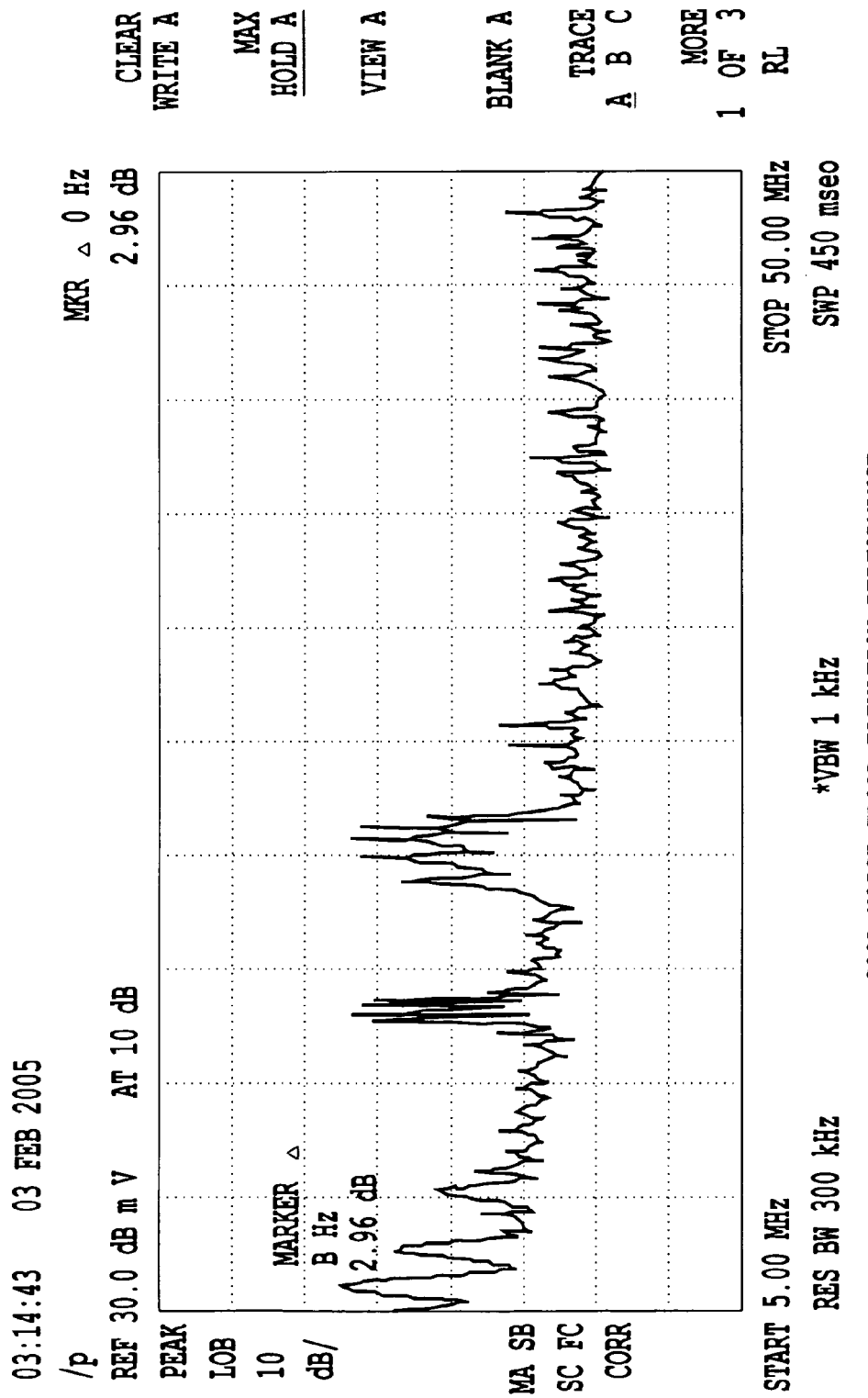
FIG. 9 is a spectrum trace showing a signal with good noise floor elevation.
Figure 10:
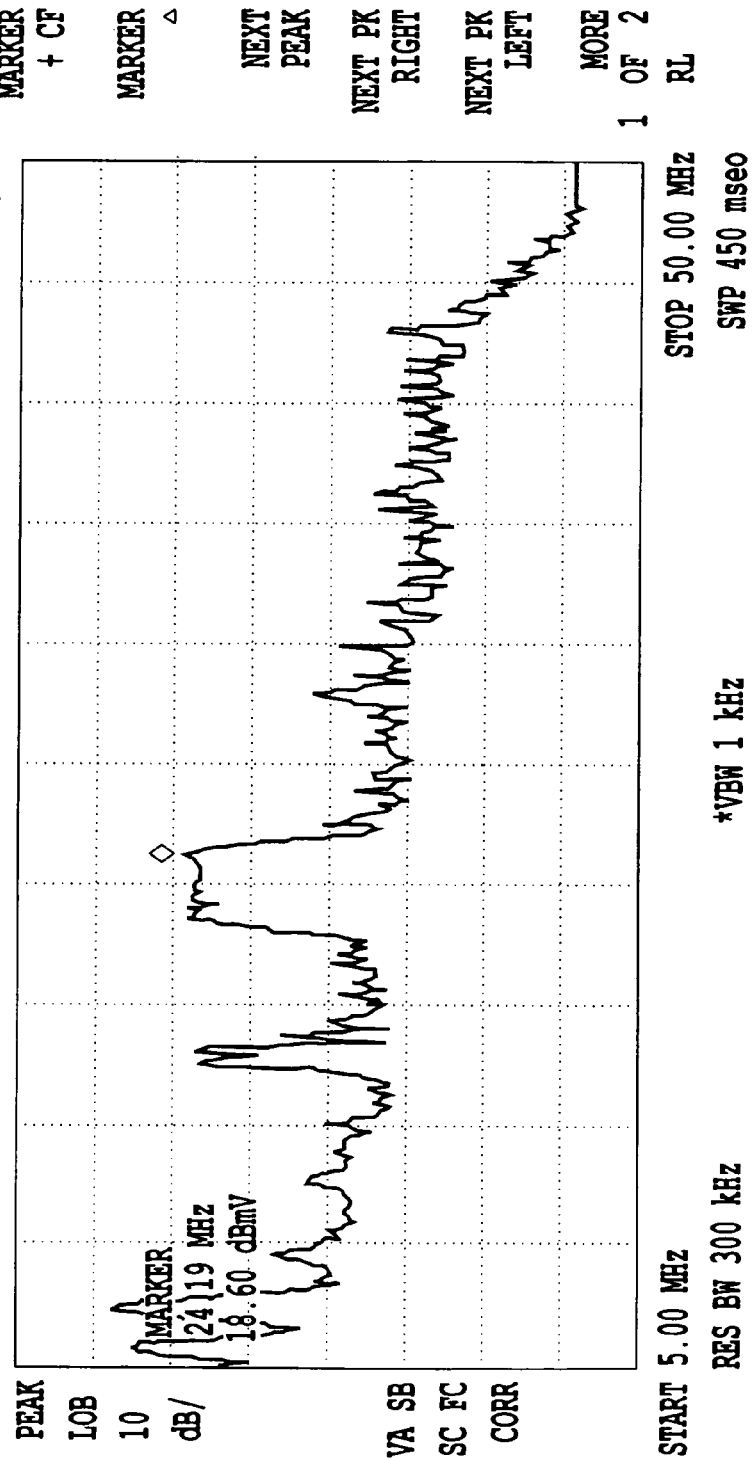
FIG. 10 is a spectrum trace showing a signal with significant ingress below 10 MHz.

At step 535 the system determines if the signal is too low by comparing the difference between the actual and target OMI and the allowable error in OMI. If the difference is smaller than the error the system goes through a progression of analyzing the modem power (step 540) and the noise floor (step 545) before outputting a recommendation to check the RF plant (step 560), increase the node gain or the RF gain (step 555) and/or increasing the CMTS attenuator (step 550). At step 565, the system determines if the ingress is acceptable in the OMI by comparing the tolerable noise floor with the actual noise floor, and if the actual noise floor is above the tolerable limit, then the system recommends checking the RF gain, or the RF plant (570). An exemplary spectral output of a signal having a significant ingress below 10 MHz is depicted at FIG. 10, for example. Then, at step 575, the system determines if the low SNR is acceptable for the actual OMI by determining if the SNR is below the minimum required for service. An exemplary diagram of a spectral output illustrating a poor noise floor is depicted in FIG. 8, for example, while a signal having a good noise floor elevation performance is depicted at FIG. 9. If it is, then the RF gain, node gain, and RF plant are to be checked (step 580), if the problem still exists (step 585), then new hardware must be installed in the transmitter, or the OMI of the system should be calibrated (step 590).

TABLE 3

Prescriptive Parameters and Thresholds

| Param's | Comments |
|---|---|
| A | Difference between actual service OMI and target OMI, negative it too low |
| BPM1 | Band power of service |
| BPM2 | Band power of total return band |
| NFR | Noise floor rise due to max hold procedure |

TABLE 3-continued

Prescriptive Parameters and Thresholds

| Limits | Units that fall between OK and bad are marginally bad | OK | Bad |
|---|---|---|---|
| NFR_max | Maximum tolerated noise floor rise in max hold procedure, control tolerated ingress | 5 | 10 |
| PM_min | Minimum tolerated average modem power | 40 | 37 |
| PM_max | Maximum tolerated average modem power | 48 | 49 |
| PO_max | Maximum tolerated power in total spectrum relative to service | 3 | 6 |
| SNR_min | Minimum required SNR for service | 37 | 27 |
| A_err | Error allowed in target OMI for service | 2 | 4 |

The prescriptive and diagnostic system also includes various functional components that allow the user to more easily interface with the system.

The built in OMI measuring unit 17, which displays a result on the GUI 18, at the headend receiver allows a user to view return transmitter OMI in real time without the use of any extra equipment. Such a display promotes reverse path performance monitoring metric, allows for easy and standard set-up procedures, and displays OMI in real time through measurement of the light entering the receiver and the total RF power of each receiver. The headend receiver 40 also may have a 3 Mhz OMI tone at a specific RF level for detection and calibration in absolute terms the OMI at each receiver.

A built in spectrum display 18 at the GUI of the reverse receiver displays the spectrum in real time. The spectrum display at the GUI makes the physical layer more robust and provides defined figures of merit to implement new services such as VoIP. This enables users to keep track of ingress events and RF performance of the reverse links. The built in spectrum display is especially applicable to the case of VoIP, because the spectrum display uses variable narrowband detection.

The microprocessor 19 source code implements a software algorithm that provides a slow picture of the spectrum, which is passed though the CMM to the GUI for processing and display. As in the OMI display case, it is possible to correlate in absolute terms the power density in the various spectrum components. Several interfaces include: set-up OMI for the 3 MHz channel, cumulative real time OMI of the reverse link, cumulative gain of the reverse system, RF spectrum display, frequency range of interest—power within the band, average ingress power—power not in the above band, figures of merit for reverse transmitter utilization, loop back tests and optimization algorithms, long term averaging, max hold, min hold features, and direct connectivity to a network service manager (NSM).

The present system also includes a digitizing reverse path that allows for more sophisticated CNR/SNR/QAM/QPSK mask setting and limit setting, and promotes a robust reverse path. The digitizing reverse path provides a differentiator in addition to robust performance by using A/D reverse system.

Figure 12:
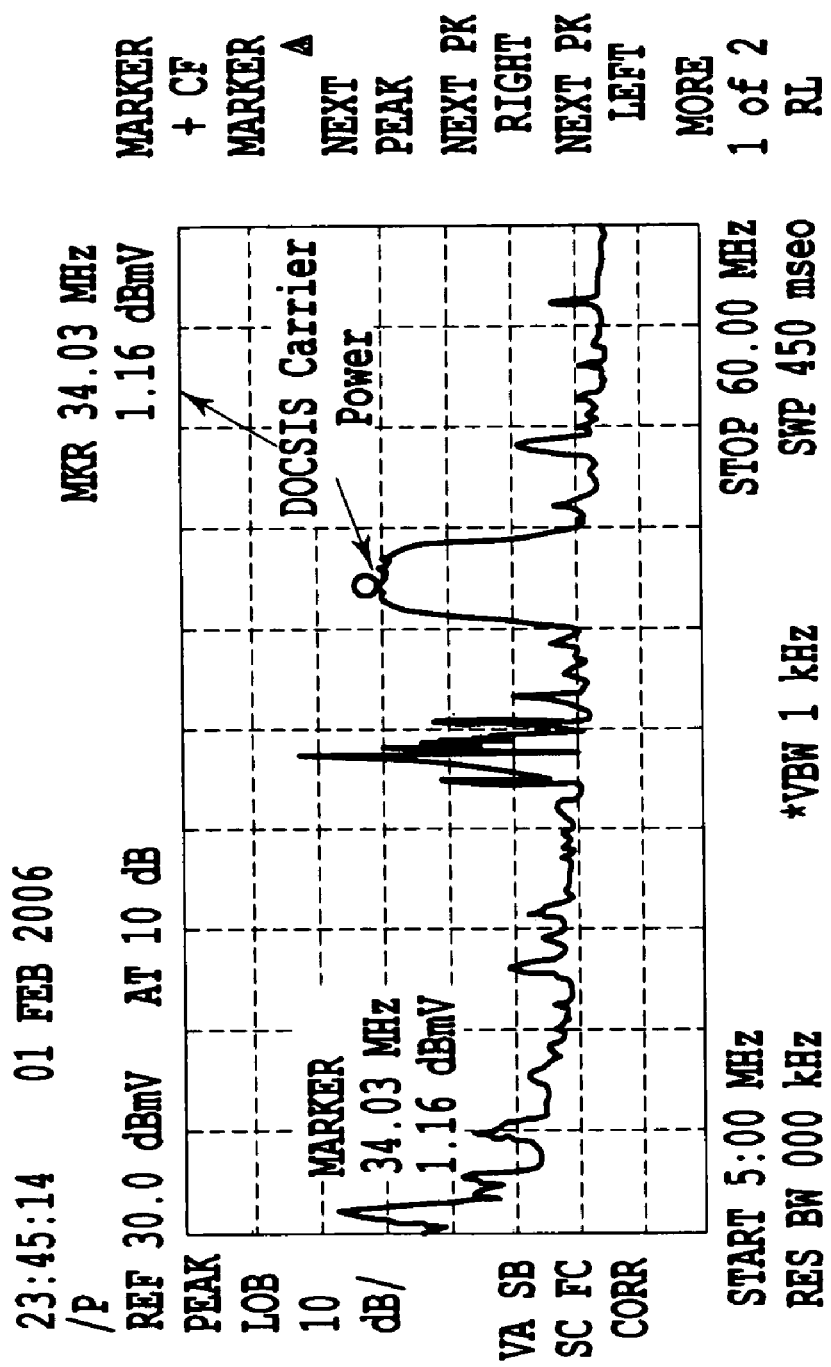
FIG. 12 is a spectrum trace showing a DOCSIS carrier power measurement.

The process of measuring CNR in a DOCSIS carrier is described below with reference to FIG. 12, which is a spectral output of a DOCSIS carrier. Measuring CNR on the bursty DOCSIS carrier is substantially different from video CNR. An accurate representation of CNR can be achieved by the following spectrum analyzer settings:

Start frequency: 5 MHz
Stop Frequency: 50 MHz
Resolution BW: 23 kHz
Video BW: 1 kHz
Sweep time: Auto (around 450 mSec)
Reference level: 30 or 40 dBmV
Vertical scale: 10 dB/div
Trace: Max Hold Then a receiver test point signal or a directional coupler in the main RF output line is inserted into the analyzer input. The analyzer will then sweep several times to fill in the DOCSIS "haystack", allowing a marker to be placed over the peak of the haystack. This marker is then used as a delta to create a second marker, but not removed from the spectral output.

With the original marker and the delta marker virtually overlapping each other the max hold function is removed and the haystack will disappear. However, the original marker will remain in place and the delta marker will fall to the noise floor. The CNR can then be read directly from the marker delta display.

As depicted in FIGS. 8 and 9, the noise floor delta may also be measured using a spectral output. CNR, as measured above, references the noise floor to the non peak value. Distortions, ingress, and other impairments cause intermittent spikes throughout the spectrum, and the amount of increase in the noise floor is an indicator of the overall health of the return path. If there is a significant rise in the noise floor in the peak hold mode, one of several remedies may be required, including return plant balancing or isolation of noise source from a particular feeder leg or drop.

To measure the noise floor delta, the analyzer may be set as follows:

Start frequency: 5 MHz
Stop Frequency: 50 MHz
Resolution BW: 23 kHz
Video BW: 1 kHz
Sweep time: Auto (around 450 mSec)
Reference level: 30 or 40 dBmV
Vertical scale: 10 dB/div
Peak Hold: Off A marker is placed in the return spectrum away from any carriers or other coherent interference. The delta marker function is then enabled and the analyzer is set in the peak hold mode, and allowed to sweep for approximately 2 minutes. The rise in the noise floor will be read from the delta marker display.

The ingress measurement, as depicted in FIG. 10, is also a value that may be determined by a spectrum analyzer. Specifically, the spectrum below 10 MHz is very prone to ingress, which may enter the plant through either the hard line coax or customer drop system. Ingress is one of the most difficult impairments to manage since it can have many points of entry. While signals in the 10 MHz portion of the spectrum are not commonly used, they do add to the modulation of the laser and can lead to laser clipping if they are of sufficient magnitude. Accordingly, it is important that ingress be carefully monitored and managed.

An accurate way to measure ingress is to compare the power of the entire return spectrum (5-42 MHz) to that of the DOCSIS carrier(s). In a system transporting a single DOCSIS carrier, if the total spectral power is more than 3 dB greater than that of the DOCSIS carrier, then remedial action to resolve ingress may be recommended. For systems with other transmitter loading, a baseline is typically determined that indicates when action is necessary. The purpose of this measurement is to provide a minimum margin for error for ingress before laser clipping will occur.

To measure ingress using a spectral output of a received signal, the following spectrum analyzer settings are used:

Start frequency: 5 MHz

Stop Frequency: 50 MHz
Resolution BW: 23 kHz
Video BW: 1 kHz
Sweep time: Auto (around 450 mSec)
Reference level: 30 or 40 dBmV
Vertical scale: 10 dB/div
Trace: Max Hold A receiver test point signal is inserted into analyzer input, or a 20 dB directional coupler is placed in the main RF output line. The analyzer then makes several sweeps in order to "fill in" the DOCSIS carrier haystack. Once complete, the DOCSIS carrier level can be measured by placing a marker on the peak of the haystack, noting that the actual carrier power is approximately 10 dB higher than the marker reading because of the 3.2 MHz bandwidth of the carrier being sampled by the 23 kHz resolution filter of the analyzer.

As noted above, a common prescriptive measure for correcting problems in circuits is to adjust the power of the optical transmitters 50 of the node 20. An exemplary embodiment of a variable power optical transmitter provides previously unforeseen advantages to the user in simplifying logistics and set up for the entire cable system. As implementation, for example, a modified push pull amplifier is used as a controllable distortion generator that allows adequate linearization control. The variable power transmitter could be implemented in the optical node or in a headend. When implemented in the node, it operates with reverse path signals generally from 5 MHz to up to 200 MHz and operates over a wide temperature range for example from −40 to +60 C range. When used in the headend, it operates with forward signals generally from 40 MHz to 1 GHz and operates over a relatively narrower temperate range from 0 to 50 C. The sphere of invention extends over the forward and reverse transmitters. The following section describes the process for a forward transmitter with the understanding that the same could apply to the reverse transmitter as well.

Generally the forward headend transmitter 50 includes an RF circuit followed by an optical laser. To facilitate operation of the laser, there is a bias circuit that supplies current used to maintain optical power. In fixed output power transmitters the aim is to adjust the bias current as needed to maintain the output power of the laser as constant as possible.

The RF circuit comprises an amplifying section in addition to a linearizer. The amplifying section provides appropriate amplification to input RF such that the signal incident upon the laser is transformed into a correct optical modulation index (OMI) for the optical laser. Generally there is a relationship between the RF input incident on the laser and the bias current (less the threshold current) of the laser. Higher bias current for the same laser would invite higher RF level to produce the same OMI from the laser.

In fixed output transmitters there is little variation in the bias current but not significant variation at an given temperature. The RF linearization circuit is then generally set up at the initial test and set up and left to run in many cases without any significant further feedback.

In variable output transmitters, however, the output power of the transmitter is variable, meaning that the bias current of the laser varies in proportion to the needed output level. This variation could be as much as 40% or more of initial bias current depending upon the range of optical level changes at the same give temperature. This variation in bias current would then require different RF levels to maintain the same OMI in the laser. This can be achieved by communicating the change in bias current to the RF section and dynamically adjusting the RF level into the lasers in proportion to the change, as will be described below.

Further, the lasers generally provide a differing level of distortions based on the optical output. Therefore, there is a need to provide a linearizer that can provide for cancellation of varying amounts of distortions dynamically. Such a linearizer is another sphere of the invention.

There is a need to keep track of the output power of the laser, the bias current and the state of the linearizer in making the variable output transmitter. Keeping track of such data has an ancillary benefit of providing future automatic set-up instructions when combined with automatic software and forms a further avenue of the invention.

Within the prescriptive system of the present invention variable power optical transmitters provide previously unforeseen advantages to the user in simplifying logistics and set up. Typically such transmitters rely on linearization to obtain good distortion performance, and when the transmitter output power is varied, so must the linearization. The variation required for the linearizer can be very large and, in a vector domain, can require that the signal vector of the linearizer is opposite for different output power levels. This is not achieved easily without constructing a complex linearizer circuit.

FIG. 1 depicts the node transmitter 50 that can change output power thru the GUI 48 and maintain linearization over the whole range. Such a node 20 results in reduced inventory, hitless upgrade over power levels, reduced truck rolls, automatic upgrade with varying mix of digital and analog services (via AGC, ADC, Tilt controls). The node 20, also includes an OMI display allowing a user to view a transmitter OMI setting without the need for any extra equipment. A microprocessor 47 is used to calculate and display on the GUI 48 the so-called "personality" of the transmitter. The software in the microprocessor 47, allows a user to store linearizer settings in a memory 51, and apply the transmitter's current status to other transmitters enmasse (to promote uniformity in the MSO system), increasing the reliability of modulation format upgrades without fear of down time or technician errors.

As noted above, the laser transmitters rely on linearization to obtain good distortion performance, and when the transmitter output power is varied, so must the linearization. The variation required for the linearizer can be very large and, in a vector domain, can require that the signal vector of the linearizer is opposite for different output power levels.

Figure 14:
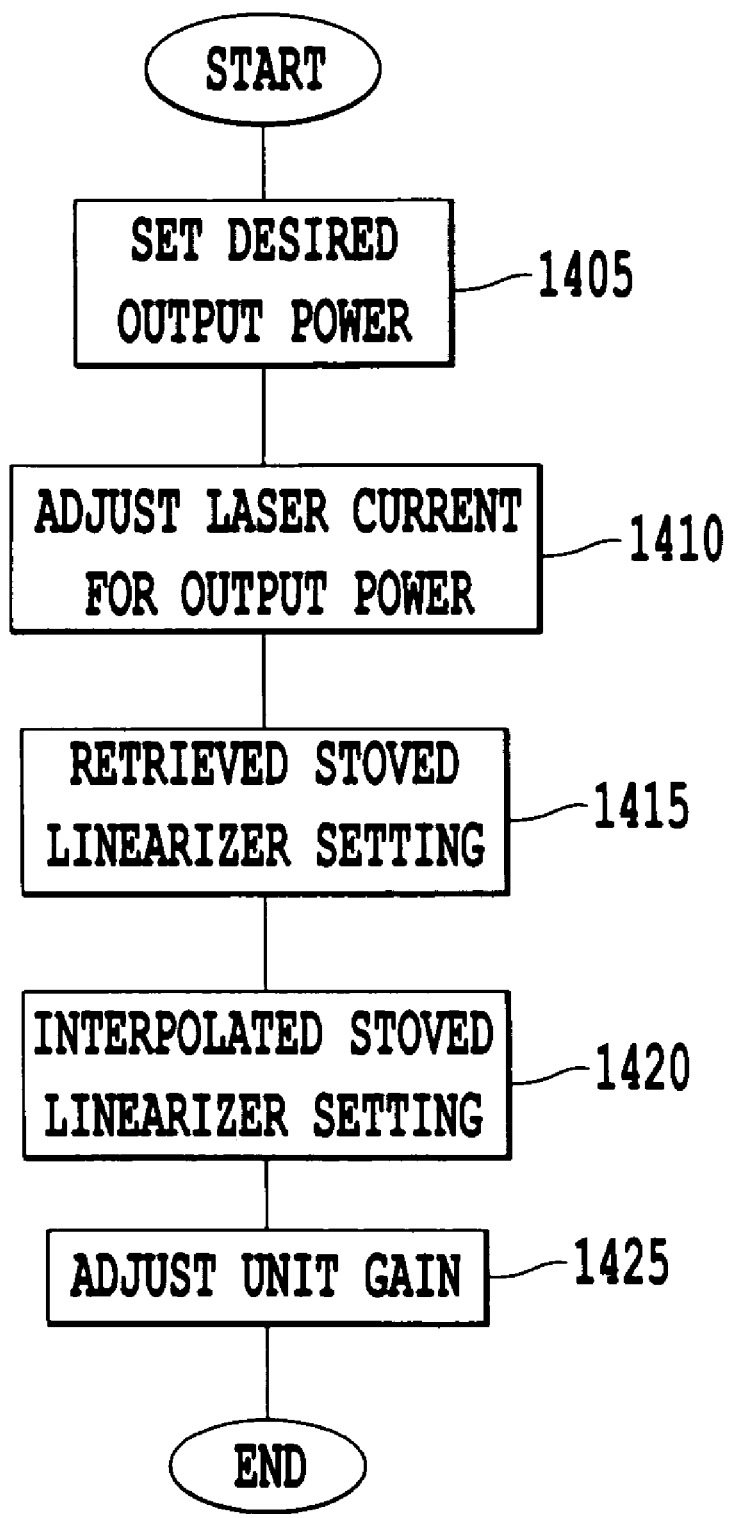
FIG. 14 is a flow chart of a process for calibrating a linearizer in a variable gain transmitter.

The flow chart at FIG. 14 describes a process of setting up a linearizer according to one aspect of the present invention. At step 1405, a desired output power of the laser is selected, and the laser current is adjusted to correspond to the output power at step 1410. As noted above, an adjustment of the output power may result in an increase in the distortion level of the signal transmitted from the laser. The stored linearizer settings are then retrieved from memory 51 and interpolated to adjust the unit gain (steps 1415-1425).

Using the feedback linearizer described in US2003/0001670 A1 incorporated herein by reference, and now combining this method with a push-pull driver (one feedback circuit for each one of the two amplifiers in a push-pull stage) the distortion vector sign can be controlled and reversed as needed.

Figure 15:
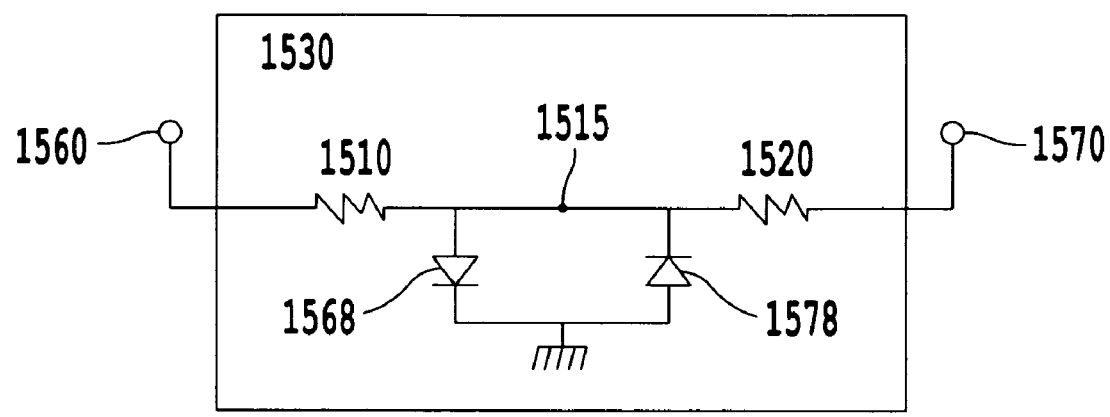
FIG. 15 shows an exemplary linearizer circuit according to one embodiment of the invention.

Such control is provided by using a nonlinear feedback circuit such as that depicted in FIG. 15, and controlling the current and/or voltage of the nonlinear elements in the feedback circuit. As depicted in FIG. 15, a first resistor 1510 and a second resistor 1520 are connected in series between network input node 1570 and network output node 1560. Node 1515 represents a point between the series connected resistors 210 and 220. A first diode 1568 and a second diode 1578 are connected in parallel, with reversed polarity, between node 1515 and ground. First and second diodes may be replaced by another type of electronic, optical, or electro-optical switch such as, inter alia, a transistor element. The feedback circuit may be built as in FIG. 15, or may take any other embodiment with nonlinear components.

Figure 16:
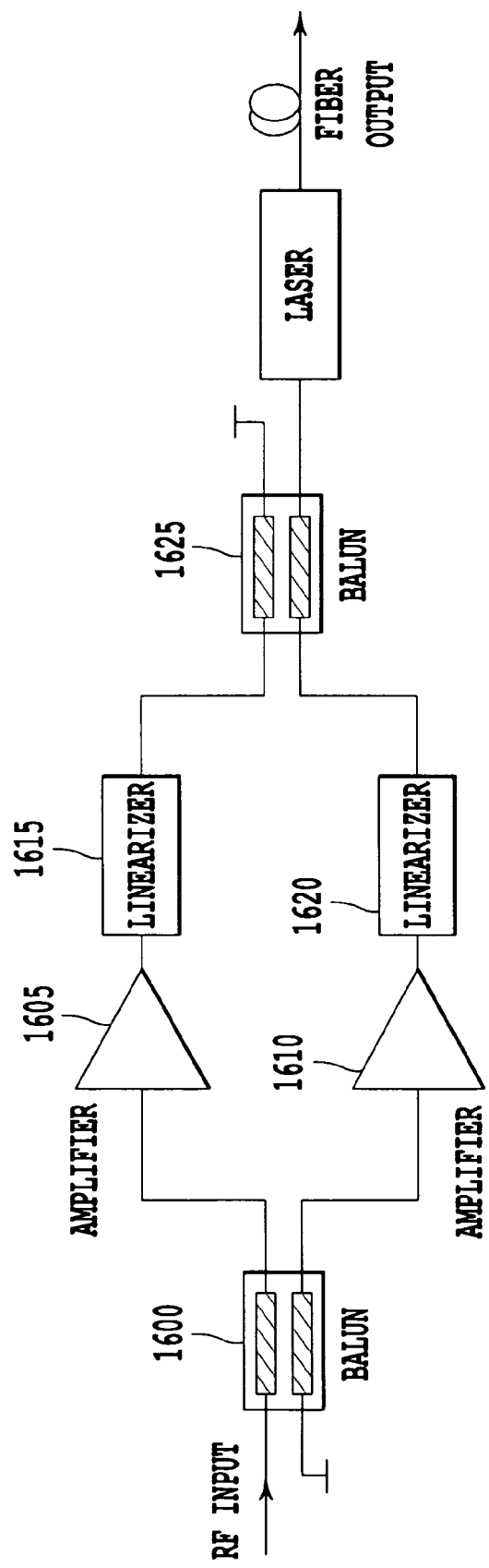
FIG. 16 shows an in-line linearizer circuit according to one embodiment of the invention.

As depicted in FIG. 16, the push-pull circuit receives and RF input that has been split into two signals of opposite polarity using a balun 1600. The first branch of the push pull circuit including the first amplifier 1605 and the first linearizer 1615, handles a signal with opposite polarity to that of the second branch, which includes a second amplifier 1610 and a second linearizer 1620. By similarity great freedom is obtained to control the polarity of distortion signals that can be generated if both stages of the push pull circuit have their own distortion generating capability. The signals are then combined by the balun 1625 and transmitted to the laser portion to be sent over the optical link. This allows adequate linearization for lasers that are operated at different, variable output powers by providing a capability to introduce signal distortion in both the in-phase and out-of-phase components of the input RF signal.

Figure 17:
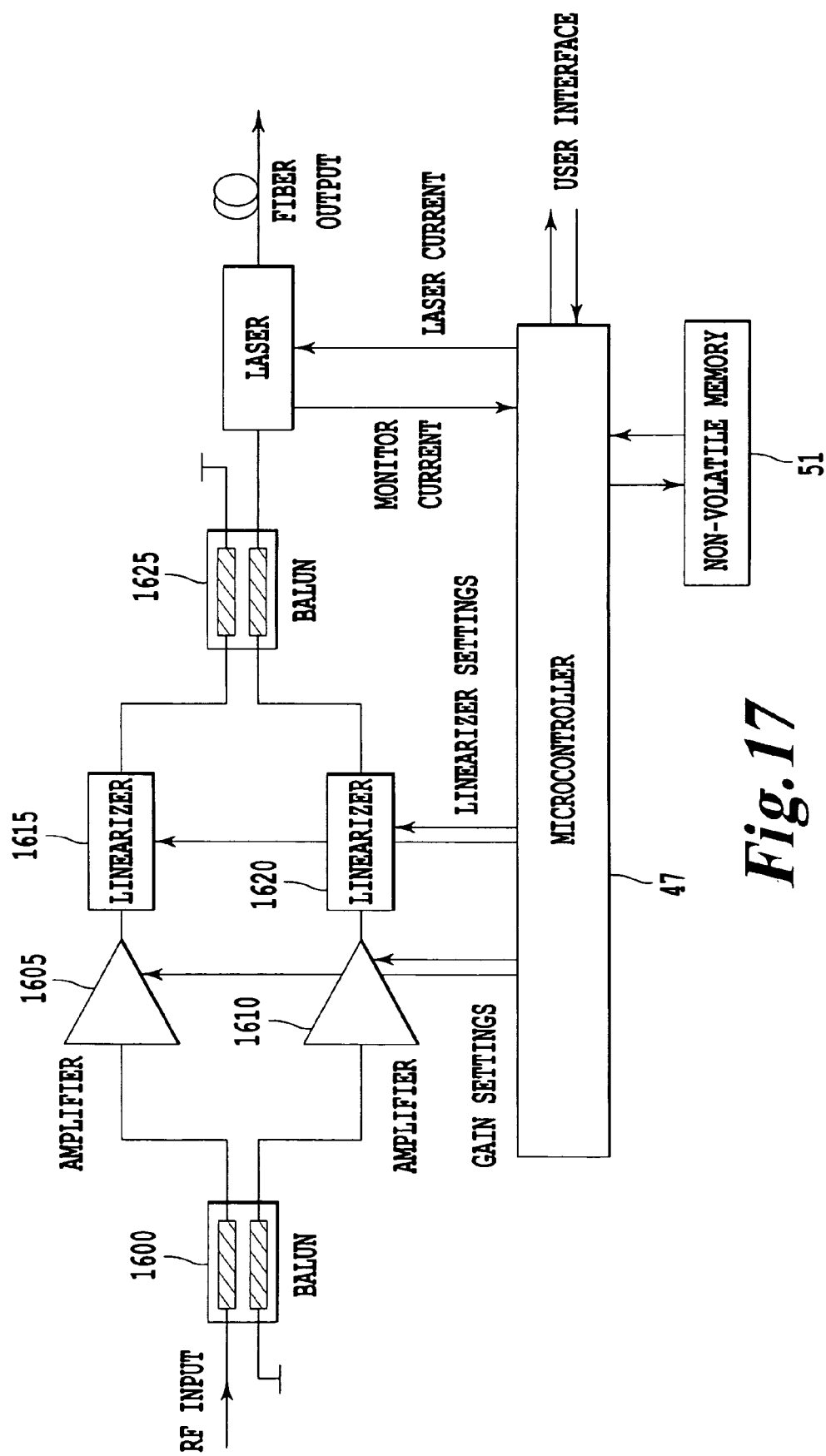
FIG. 17 shows a microcontroller controlled linearizer circuit according to one embodiment of the invention.

FIG. 17 depicts an alternative embodiment of the in-line distortion circuit described in FIG. 16, but also references the microprocessor 47 and a non-volatile memory 51 which may be used, inter alia, to control and store settings of each or the linearizers and amplifiers. As noted, above it is desirable to keep track of the output power of the laser, the bias current and the state of the linearizer in making the variable output transmitter. Keeping track of such data has an ancillary benefit of providing future automatic set-up instructions when combined with automatic software and forms a further avenue of the invention. Such tracking, setting storage, and control can be performed by the microcontroller 1630 and the non-volatile memory 1635, which monitor and control the amplifier, linearizer and laser settings.

Figure 18:
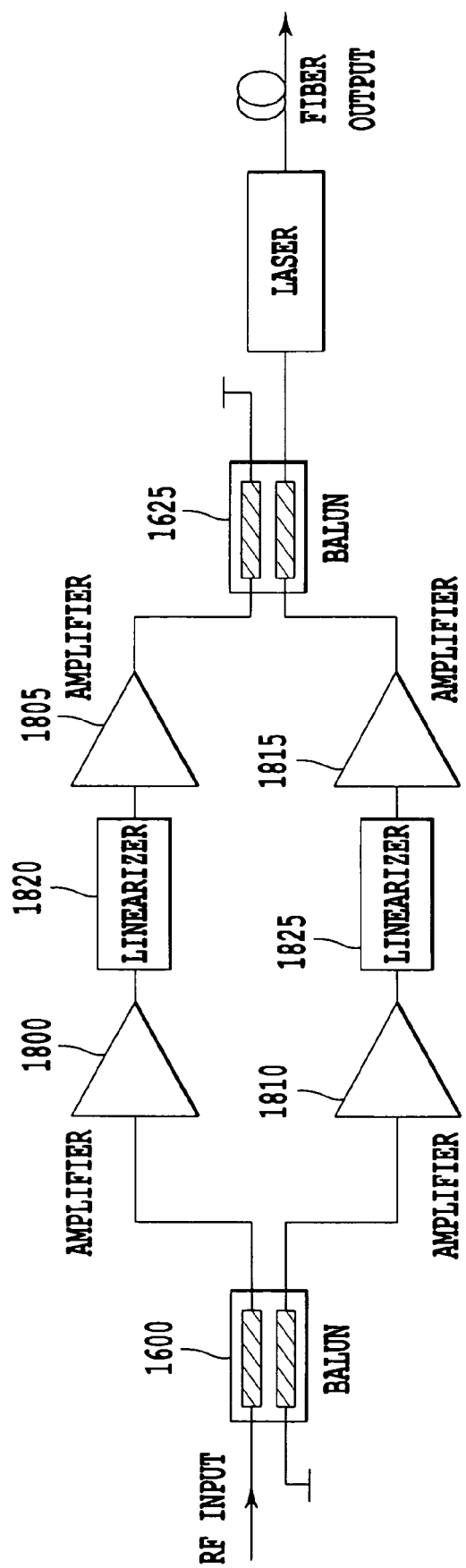
FIG. 18 shows a linearizer circuit according to one embodiment of the invention.

FIG. 18 depicts another embodiment of the linearizer circuit, in which a first amplifier 1800 and a second amplifier 1810 are respectively arranged at the input of a first linearizer 1820 and a second linearizer 1825. A third amplifier 1805 and a fourth amplifier 1815 are then provided at outputs of the first linearizer 1820 and a second linearizer 1825, respectively.

Figure 19:
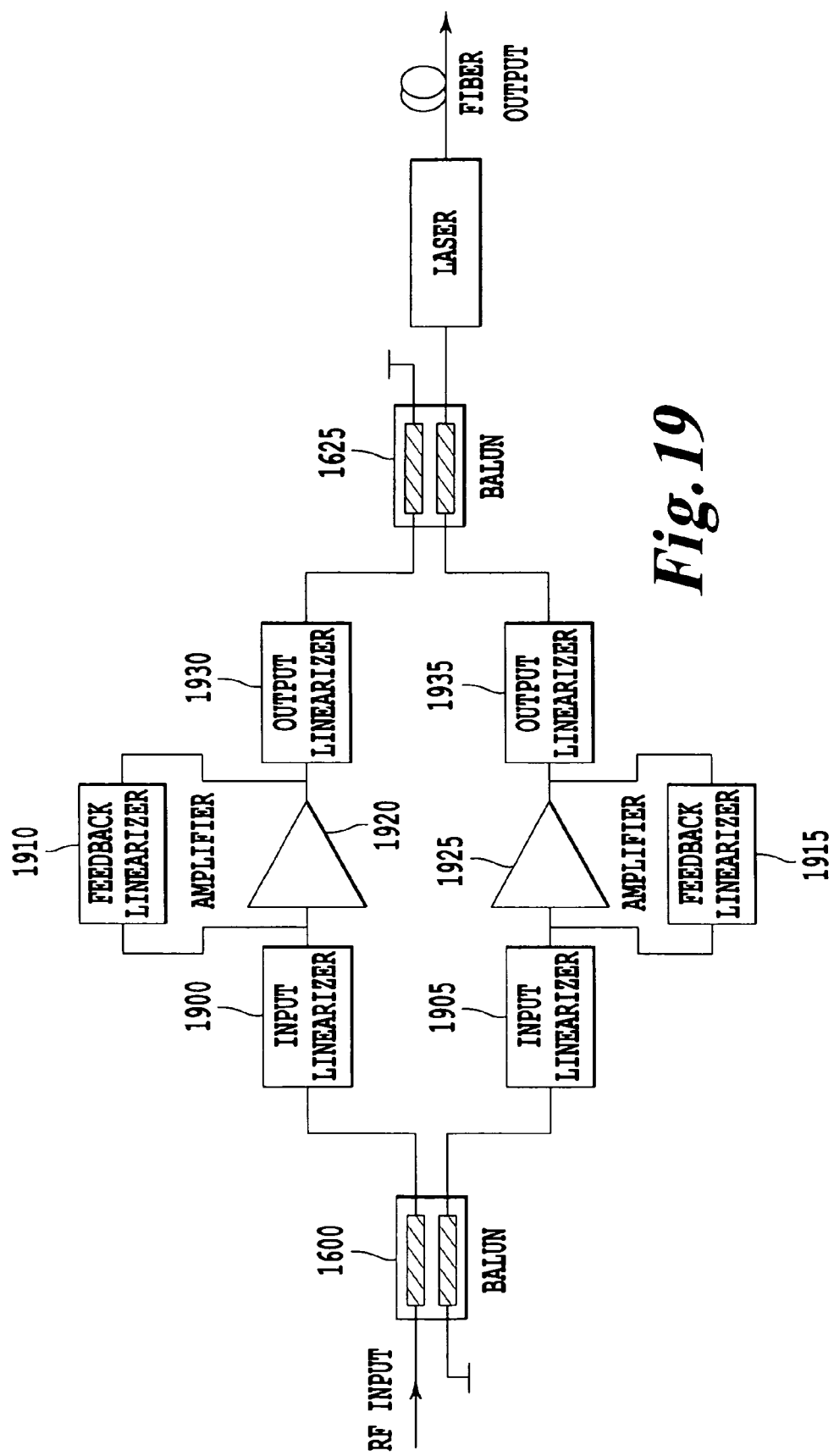
FIG. 19 shows a feedback linearizer circuit according to one embodiment of the invention.

FIG. 19 depicts another embodiment of the linearizer circuit, which a first branch includes an input linearizer 1900, an amplifier 1920 which is connected at both its input and output to a feedback linearizer 1910, and an output linearizer 1625 located at the output of the amplifier 1920. Similarly, the second branch includes an input linearizer 1905, an amplifier 1925 which is connected at both its input and output to a feedback linearizer 1915, and an output linearizer 1635 located at the output of the amplifier 1925.

It should also be noted from the above description that use of the linearizer depicted in FIG. 15 is not strictly required when a push-pull amplifier is modified to generate a linearization signal with varying distortion signal polarity. Controllable in line distorters in each one of the two branches of the push pull amplifier, be it at the input or at the output of the amplifier, can also be used to provide linearization signals with great control over polarity (phase) and magnitude. In yet another embodiment the distortion signals are generated interstage in a push-pull amplifier arrangement such that the required distortion components can be injected in each branch of the push pull amplifier. In all these embodiments it is not required that identical distortion signal generators are used in the two branches of the push pull amplifier because not all distortion components need full freedom of polarity (phase) control.

It should be noted that any process descriptions or blocks in flow charts could be understood as representing modules, segments, or portions of code which include one or more executable instructions for implementing specific logical functions or steps in the process, and alternate implementations are included within the scope of the above-noted embodiments of the present invention in which functions may be executed out of order from that shown or discussed, including substantially concurrently or in reverse order, depending on the functionality involved, as would be understood by those reasonably skilled in the art of the present invention.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of diagnostic and prescriptive management of hybrid fiber-coax network, comprising:
    collecting network performance parameters related to a network circuit;
    comparing the collected network performance parameters with predetermined thresholds corresponding to the collected network performance parameters to grade circuit performance;
    selecting a circuit, based on the comparing step, in which at least one of the network performance parameters falls below the respective threshold;
    determining at least one additional network performance parameter to be analyzed on the selected circuit, the additional network performance parameter comprising at least an RF power measurement;
    outputting a recommended prescribed modification to the selected circuit based on the at least one additional tested network performance parameter,
    the RF power measurement includes a measurement of an optical modulation index (OMI) of the signal;
    the measurement of the OMI is performed on a calibrated receiver, and
    the calibration of the receiver includes using a reference transmitter, and establishing an optical power into the calibrated receiver to compute RF power at an RF test point.

2. A method of diagnostic and prescriptive management of hybrid fiber-coax network, comprising:
    collecting network performance parameters related to a network circuit;
    comparing the collected network performance parameters with predetermined thresholds corresponding to the collected network performance parameters to grade circuit performance;
    selecting a circuit, based on the comparing step, in which at least one of the network performance parameters falls below the respective threshold;
    determining at least one additional network performance parameter to be analyzed on the selected circuit, the additional network performance parameter comprising at least an RF power measurement;
    outputting a recommended prescribed modification to the selected circuit based on the at least one additional tested network performance parameter,
    the circuit comprises a customer modem, a RF plant, optical node, reverse transmitter, reverse headend receiver and CMTS;
    determining the RF power measurement relative to an expected power for a predetermined OMI;

adjusting the modem output power by changing an attenuator corresponding to the CMTS such that the CMTS sets the modem at a desired output power through automatic power gain control; and adjusting gain in the RF plant if the modem power has reached a limit.

3. A method of diagnostic and prescriptive management of hybrid fiber-coax network, comprising:

collecting network performance parameters relating to a network circuit;

comparing the collected network performance parameters with predetermined thresholds corresponding to the collected network performance parameters to grade circuit performance;

selecting a circuit, based on the comparing step, in which at least one of the network performance parameters falls below a respective threshold;

outputting a recommended prescribed modification to the selected circuit based on the at least one of the network performance parameters falls below a respective threshold, the at least one network performance parameters comprises an RF power measurement;

the RF power measurement includes a measurement of an optical modulation index (OMI) of the signal;

the measurement of the OMI is performed on a calibrated receiver;

the calibration of the receiver includes using a reference transmitter, and establishing an optical power into the calibrated receiver to compute RF power at an RF test point.

4. A method of diagnostic and prescriptive management of hybrid fiber-coax network, comprising:

collecting network performance parameters relating to a network circuit;

comparing the collected network performance parameters with predetermined thresholds corresponding to the collected network performance parameters to grade circuit performance;

selecting a circuit, based on the comparing step, in which at least one of the network performance parameters falls below a respective threshold;

outputting a recommended prescribed modification to the selected circuit based on the at least one of the network performance parameters falls below a respective threshold;

the circuit comprises a customer modem, a RF plant, optical node, reverse transmitter, reverse headend receiver and CMTS;

determining the received RF signal power relative to an expected power for a predetermined OMI;

adjusting a power level of the modem by changing an attenuator corresponding to the CMTS such that the CMTS sets the modem at a desired output power through automatic power gain control; and adjusting gain in the RF plant if the modem power has reached a limit.

5. A method of diagnostic and prescriptive management of hybrid fiber-coax network, comprising:

at least one network computing device collecting electrical and/or optical signals representing network performance parameters relating to a network circuit comprising a customer modem, a RF plant, optical node, reverse transmitter, reverse headend receiver and CMTS;

the network computing device applying at least one processor to compare the collected network performance parameters with predetermined thresholds corresponding to the collected network performance parameters to grade circuit performance, to select a circuit, based on the comparing step, in which at least one of the network performance parameters falls below a respective threshold; to compare the variation of at least one of the network performance parameter over a long term and at least one of another parameters over a short term; to output a recommended prescribed modification to the selected circuit based on the comparison of the at least one of the network performance parameter over a long term and the at least one of another parameters over a short term; and to estimate ingress based on the difference between the at least one of the network performance parameter over a long term and at least one of another parameters over a short term, and a theoretical error estimation based on the reported CNR.

6. A method of diagnostic and prescriptive management of hybrid fiber-coax network, comprising:

at least one network computing device collecting electrical and/or optical signals representing network performance parameters relating to a network circuit comprising a customer modem, a RF plant, optical node, reverse transmitter, reverse headend receiver and CMTS;

the network computing device applying at least one processor to compare the collected network performance parameters with predetermined thresholds corresponding to the collected network performance parameters to grade circuit performance; to select a circuit, based on the comparing step, in which at least one of the network performance parameters falls below a respective threshold; to compare the variation of at least one of the network performance parameter over a long term and at least one of another parameters over a short term; to output a recommended prescribed modification to the selected circuit based on the comparison of the at least one of the network performance parameter over a long term and the at least one of another parameters over a short term; and to estimate ingress based on the difference between the at least one of the network performance parameter over a long term and at least one of another parameters over a short term, and a theoretical CNR estimation based on the reported error rate.

* * * * *